United States Patent
Araie et al.

(10) Patent No.: US 11,794,252 B2
(45) Date of Patent: Oct. 24, 2023

(54) LAMINATION MOLDING METHOD AND LAMINATION MOLDING SYSTEM

(71) Applicant: Sodick Co., Ltd., Kanagawa (JP)

(72) Inventors: Ichiro Araie, Kanagawa (JP); Toshio Kaji, Kanagawa (JP); Yasuyuki Miyashita, Kanagawa (JP); Katsuhiko Kobayashi, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 19 days.

(21) Appl. No.: 17/335,041

(22) Filed: May 31, 2021

(65) Prior Publication Data

US 2022/0023949 A1  Jan. 27, 2022

(30) Foreign Application Priority Data

Jul. 22, 2020  (JP) ................... 2020-125819

(51) Int. Cl.
*B22F 10/28* (2021.01)
*B33Y 10/00* (2015.01)
(Continued)

(52) U.S. Cl.
CPC .......... *B22F 10/28* (2021.01); *B22F 10/366* (2021.01); *B22F 10/85* (2021.01); *B22F 12/41* (2021.01);
(Continued)

(58) Field of Classification Search
CPC ........ B22F 10/28; B22F 10/366; B22F 10/85; B22F 12/41; B22F 12/49; B22F 10/322;
(Continued)

(56) References Cited

U.S. PATENT DOCUMENTS

| 9,604,410 | B2  | 3/2017 | Okazaki et al. |
| 2016/0114432 | A1* | 4/2016 | Ferrar ............... B22F 12/70 |
| | | | 219/76.12 |

(Continued)

FOREIGN PATENT DOCUMENTS

| CN | 107262712 | 10/2017 |
| CN | 105312567 | 11/2017 |

(Continued)

OTHER PUBLICATIONS

CN-109434107-A: Espacenet English machine translation cited and attached (Year: 2019).*

*Primary Examiner* — Keith Walker
*Assistant Examiner* — Adil A. Siddiqui
(74) *Attorney, Agent, or Firm* — JCIPRNET

(57) ABSTRACT

A lamination molding method, which repeats a material layer forming step of forming a material layer and a solidifying step of irradiating an irradiation region of the material layer with laser beams scanned by n scanners to form a solidified layer, includes: a first dividing step and an irradiation order deciding step. In the first dividing step, the irradiation region is divided to 2n-1 or more divided regions by a plurality of first dividing lines in a manner that irradiation time of each of the divided regions to which the laser beams are simultaneously irradiated becomes equal. In the irradiation order deciding step, an irradiation order of the divided regions in the solidifying step is decided in a manner that the laser beams are simultaneously irradiated to the divided regions that are not adjacent, and the laser beams are not simultaneously irradiated to the divided regions that are adjacent.

17 Claims, 26 Drawing Sheets

(51) Int. Cl.
  *B33Y 30/00* (2015.01)
  *B22F 12/41* (2021.01)
  *B22F 10/85* (2021.01)
  *B22F 12/49* (2021.01)
  *B22F 10/366* (2021.01)
  *B33Y 50/00* (2015.01)

(52) U.S. Cl.
  CPC .............. *B22F 12/49* (2021.01); *B33Y 10/00* (2014.12); *B33Y 30/00* (2014.12); *B33Y 50/00* (2014.12)

(58) Field of Classification Search
  CPC ......... B22F 12/45; B33Y 10/00; B33Y 30/00; B33Y 50/00; Y02P 10/25
  See application file for complete search history.

(56) References Cited

U.S. PATENT DOCUMENTS

| | | | | |
|---|---|---|---|---|
| 2017/0282244 | A1 | 10/2017 | Mizuno et al. | |
| 2017/0320264 | A1* | 11/2017 | Herzog | B22F 10/20 |
| 2017/0334099 | A1* | 11/2017 | Araie | B22F 12/43 |
| 2019/0151945 | A1* | 5/2019 | Okazaki | B22F 12/00 |
| 2020/0331102 | A1 | 10/2020 | Shibahara et al. | |

FOREIGN PATENT DOCUMENTS

| | | | | |
|---|---|---|---|---|
| CN | 109434107 A | * | 3/2019 | ............ B22F 3/1055 |
| CN | 111093865 | | 5/2020 | |
| JP | 4916392 | | 4/2012 | |
| WO | 2019049981 | | 3/2019 | |

* cited by examiner

LAMINATION MOLDING METHOD AND LAMINATION MOLDING SYSTEM

CROSS-REFERENCE TO RELATED APPLICATION

This application claims the priority benefit of Japan Patent Application No. 2020-125819, filed on Jul. 22, 2020. The entirety of the above-mentioned patent application is hereby incorporated by reference herein and made a part of this specification.

BACKGROUND

Technical Field

The disclosure relates to a lamination molding method and a lamination molding system.

Related Art

As a lamination molding method of a three-dimensional molded object, various methods are known. For example, a lamination molding apparatus which implements powder bed fusion forms a material layer on a molding region that is a region in which a desirable three-dimensional molded object is formed, and sinters or melts the material layer by scanning a laser beam in a predetermined irradiation region of the material layer to form a solidified layer. Then, by repeating the formation of the material layer and the formation of the solidified layer, the lamination molding apparatus laminates a plurality of solidified layers and generates a three-dimensional molded object.

Here, a lamination molding apparatus including a plurality of scanners which scan laser beams is well-known. For example, Japanese Patent No. 4916392 discloses a manufacturing method in which a three-dimensional molded object is efficiently molded by irradiating laser beams from the plurality of scanners by a parallel operation.

In this way, when lamination molding is performed using the plurality of scanners, from the viewpoint of an increase in molding speed, preferably, the plurality of scanners are simultaneously used, and laser irradiation is simultaneously performed in a plurality of places. Meanwhile, the laser beam scanned by each of the scanners is required not to affect each other.

For example, when the laser irradiation is simultaneously performed on two places using two scanners, conventionally, an irradiation region is divided to two divided regions, one scanner is used to scan a laser beam for one divided region, and the other scanner is used to scan a laser beam for the other divided region. As a result, there is a possibility that irradiation positions of the two laser beams are close to each other in the vicinity of the boundary of the divided regions. When the irradiation positions of the laser beams which are simultaneously irradiated are close to each other, there is a risk that the temperature in the irradiation positions is excessively increased, and furthermore, there is a possibility that the temperature in the irradiation positions is unstable and the molding quality is affected. In the specification, the unintended increase in temperature due to the proximity of the irradiation positions of a plurality of laser beams is referred to as heat interference.

SUMMARY

The disclosure provides a lamination molding method and a lamination molding system which simultaneously irradiate a plurality of laser beams to increase the molding speed, and prevent interference of each laser beam to stabilize the molding quality.

According to the disclosure, a lamination molding method is provided which repeats: a material layer forming step in which a material layer is formed on a predetermined molding region; and a solidifying step in which laser beams scanned by n scanners (herein, n is an integer equal to or greater than 2) are irradiated to a predetermined irradiation region of the material layer, and a solidified layer is formed. The lamination molding method includes: a first dividing step, in which the irradiation region is divided to 2n-1 or more divided regions by a plurality of first dividing lines in a manner that irradiation time of each of the divided regions to which the laser beams are simultaneously irradiated becomes equal; and an irradiation order deciding step, in which an irradiation order of the divided regions in the solidifying step is decided in a manner that the laser beams are simultaneously irradiated to the divided regions that are not adjacent, and the laser beams are not simultaneously irradiated to the divided regions that are adjacent.

In addition, according to the disclosure, a lamination molding system is provided which includes: a computer aided manufacturing device that creates a project file in which a command according to lamination molding is defined; and a lamination molding apparatus that performs the lamination molding based on the project file. The lamination molding apparatus includes: a material layer former that forms a material layer on a predetermined molding region; and an irradiation device that has a laser source generating laser beams and n scanners (herein, n is an integer equal to or greater than 2) scanning the laser beams, and irradiates the laser beams to a predetermined irradiation region of the material layer to form a solidified layer. During a creation of the project file, the computer aided manufacturing device divides the irradiation region to 2n-1 or more divided regions by a plurality of first dividing lines in a manner that irradiation time of each of the divided regions to which the laser beams are simultaneously irradiated becomes equal, and decides an irradiation order of the divided regions in a manner that the laser beams are simultaneously irradiated to the divided regions that are not adjacent, and the laser beams are not simultaneously irradiated to the divided regions that are adjacent.

According to the disclosure, even if a plurality of laser beams are simultaneously irradiated using a plurality of scanners, each of the laser beams is prevented from interfering with each other. Accordingly, high-speed and high-quality lamination molding can be performed.

DESCRIPTION OF THE EMBODIMENTS

Hereinafter, embodiments of the disclosure are described with reference to the drawings. Various features shown in the embodiments may be combined with each other. In addition, the invention is formed independently for each feature.

Figure 1:
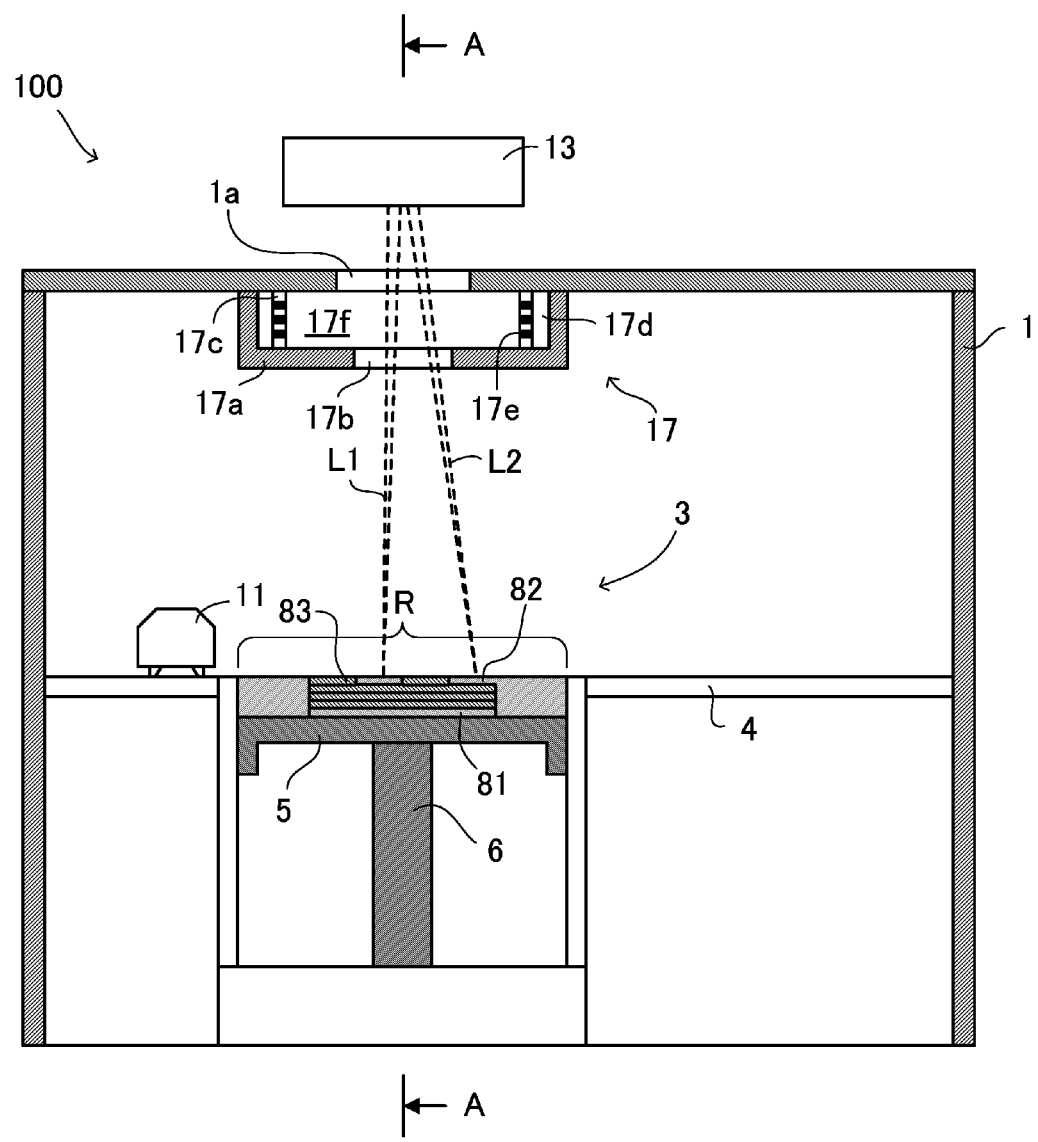
FIG. 1 is a schematic configuration view of a lamination molding apparatus according to a first embodiment.

A lamination molding apparatus 100 of a first embodiment repeats the formation of a material layer 82 and the formation of a solidified layer 83 for each divided layer which is obtained by dividing a desirable three-dimensional molded object by a predetermined thickness, and forms a three-dimensional molded object. As shown in FIG. 1, the lamination molding apparatus 100 of the first embodiment of the disclosure includes: a chamber 1, a material layer former 3, an irradiation device 13, and an inert gas supply and discharge mechanism.

The chamber 1 covers a required molding region R being a region in which the desirable three-dimensional molded object is formed. The chamber 1 is filled with an inert gas having a predetermined concentration. In the specification, the inert gas refers to a gas that does not substantively react with the material layer 82 or the solidified layer 83, and an appropriate gas is selected from a nitrogen gas, an argon gas, a helium gas, and the like according to the type of material.

On an upper surface of the chamber 1, a chamber window 1a which is a transmission window of laser beams L1 and L2 is arranged. The chamber window 1a is formed by a material which can transmits the laser beams L1 and L2. Specifically, according to the types of the laser beams L1 and L2, the material of the chamber window 1a is selected from quartz glass or borosilicate glass; crystal of germanium, silicon, zinc selenide, or potassium bromide; or the like. For example, when the laser beams L1 and L2 are fiber lasers or YAG lasers, the chamber window 1a may be configured by the quartz glass.

In addition, on the upper surface of the chamber 1, a fume diffusing device 17 is arranged to cover the chamber window 1a. The fume diffusing device 17 includes a cylindrical housing 17a, and a cylindrical diffusing member 17c disposed inside the housing 17a. Between the housing 17a and the diffusing member 17c, an inert gas supply space 17d is arranged. In addition, on a bottom surface of the housing 17a, an opening portion 17b is arranged on the inner side of the diffusing member 17c. Many pores 17e are arranged in the diffusing member 17c, and a pure inert gas which is supplied to the inert gas supply space 17d passes through the pores 17e and fills a purity room 17f. Then, the pure inert gas which fills the purity room 17f is ejected toward the lower side of the fume diffusing device 17 through the opening portion 17b. The fume diffusing device 17 prevents adherence of the fumes to the chamber window 1a and excludes the fumes from irradiation paths of the laser beams L1 and L2.

Figure 2:
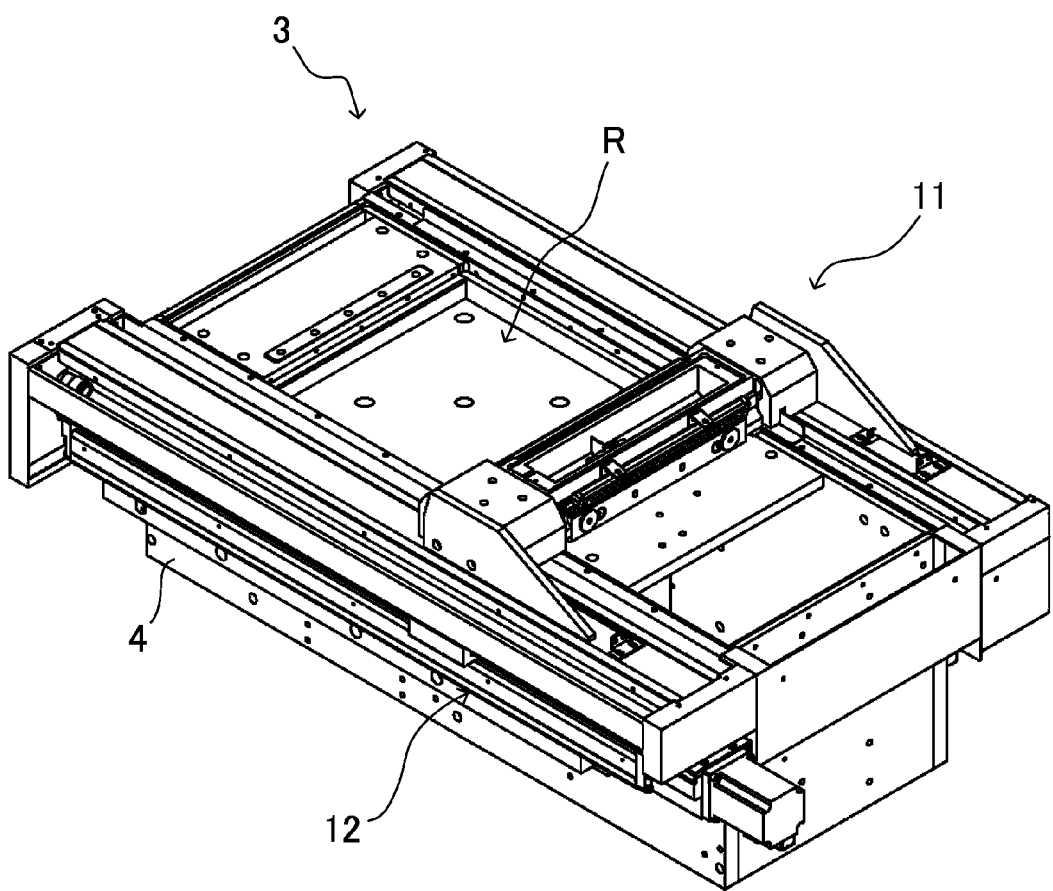
FIG. 2 is a perspective view of a material layer former.

The material layer former 3 is arranged inside the chamber 1. As shown in FIG. 1 and FIG. 2, the material layer former 3 includes a base 4 having the molding region R, and a recoater head 11 which is disposed on the base 4. In the molding region R, a molding table 5 which can be moved in an up-down direction by a molding table driving device 6 is arranged. Before the molding, a base plate 81 may be disposed on the molding table 5. When the base plate 81 is disposed, the first material layer 82 is formed on the base plate 81. Moreover, the molding region R of the embodiment has a rectangular shape, and each side is parallel to an X-axis which is a predetermined horizontal single axis direction or a Y-axis which is orthogonal to the X-axis, but it is not limited hereto.

The recoater head 11 is configured to be capable of reciprocating in the horizontal single axis direction by a recoater head driving device 12.

Figure 3:
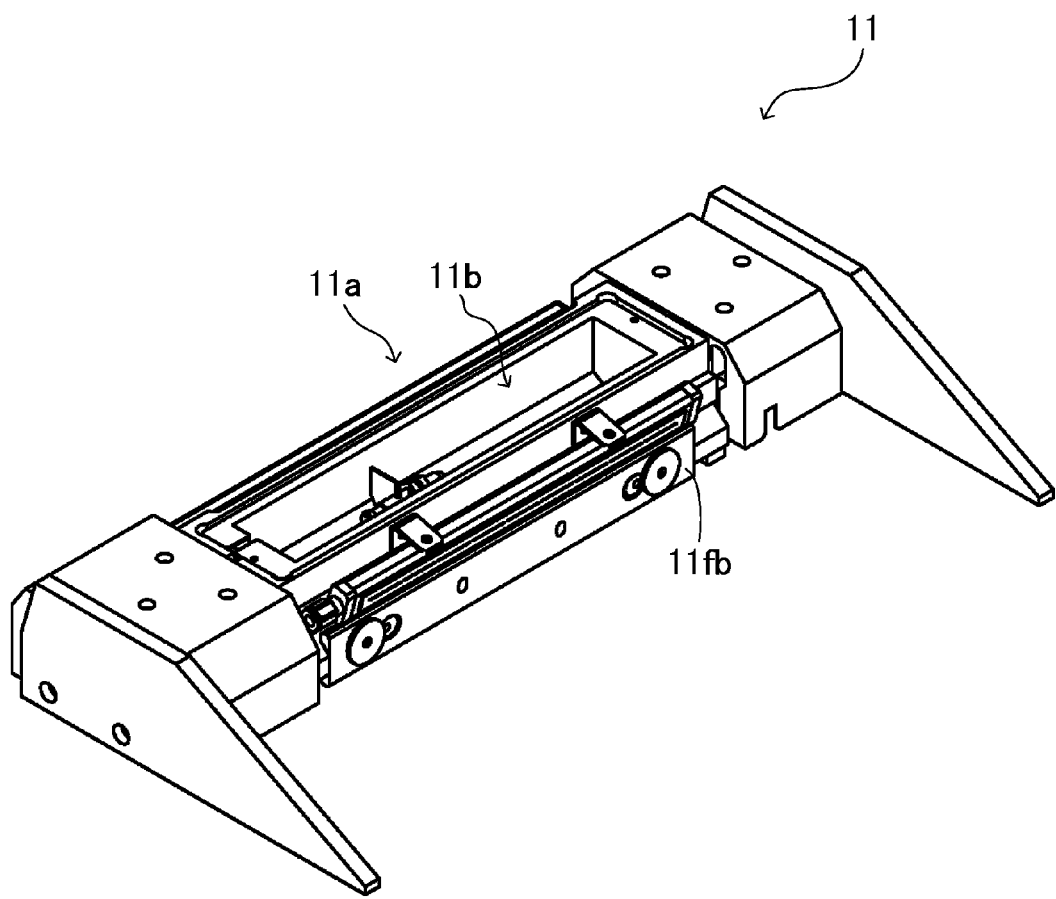
FIG. 3 is a perspective view of a recoater head when viewed from above.
Figure 4:
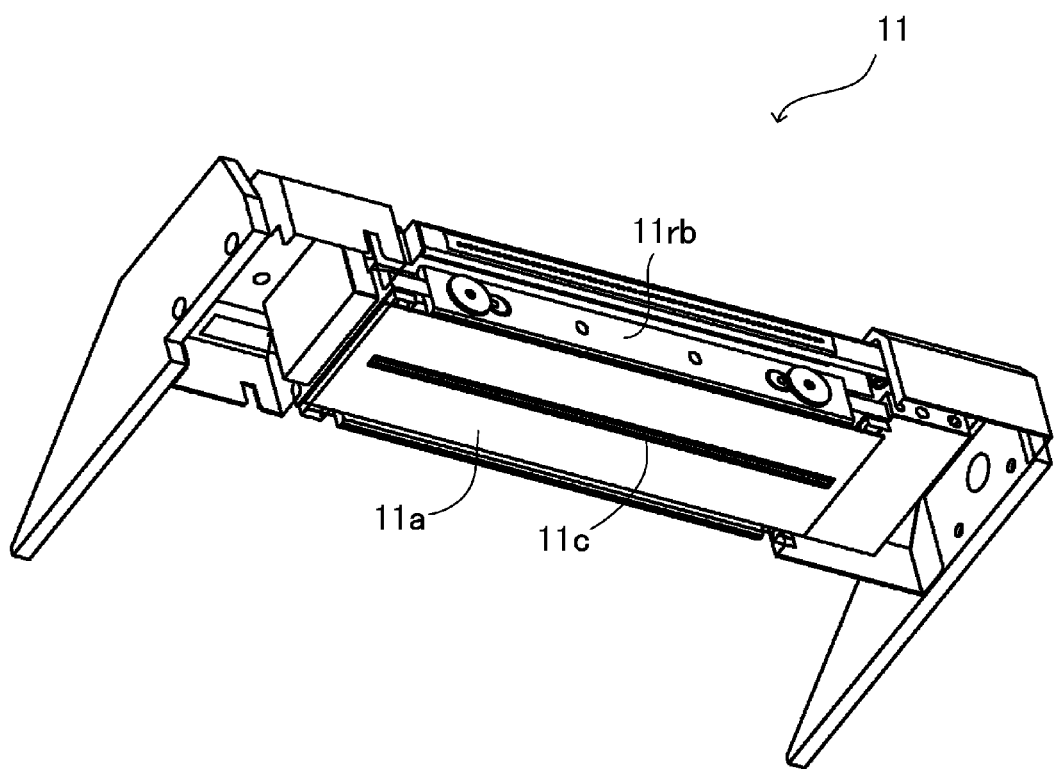
FIG. 4 is a perspective view of the recoater head when viewed from below.

As shown in FIG. 3 and FIG. 4, the recoater head 11 includes a material accommodation portion 11a, a material supply port 11b, and a material discharge port 11c. In the embodiment, as a material for forming the material layer 82, metal material powder is used.

The material supply port 11b is arranged on an upper surface of the material accommodation portion 11a, and is a receiving port of material powder which is supplied from a material supply unit (not shown) to the material accommodation portion 11a. The material discharge port 11c is arranged on a bottom surface of the material accommodation portion 11a and discharges the material powder inside the material accommodation portion 11a. The material discharge port 11c has a slit shape extending in a longitudinal direction of the material accommodation portion 11a. On two side surfaces of the recoater head 11, blades 11fb and 11rb are arranged. The blades 11fb and 11rb planarize the material powder discharged from the material discharge port 11c to form the material layer 82. Moreover, the blades 11fb and 11rb may have, for example, a flat plate shape or a brush shape.

As shown in FIG. 1, the irradiation device 13 is arranged above the chamber 1. The irradiation device 13 includes n scanners (herein, n is an integer equal to or greater than 2), and each of the scanners is configured to be capable of respectively scanning the laser beam. In the embodiment, the irradiation device 13 includes two scanners, specifically, a first galvano scanner 32 which scans the laser beam L1 and a second galvano scanner 42 which scans the laser beam L2.

The irradiation device 13 irradiates the laser beams L1 and L2 to a predetermined irradiation region S of the material layer 82 which is formed on the molding region R, melts or sinters the material layer 82 in the irradiation positions, and forms the solidified layer 83. Moreover, the irradiation region S refers to an irradiation area of the laser beams L1 and L2 in each divided layer which exists in the molding region R, and approximately coincides with a region which is defined by an outline shape of the solidified layer 83 in each divided layer.

Figure 5:
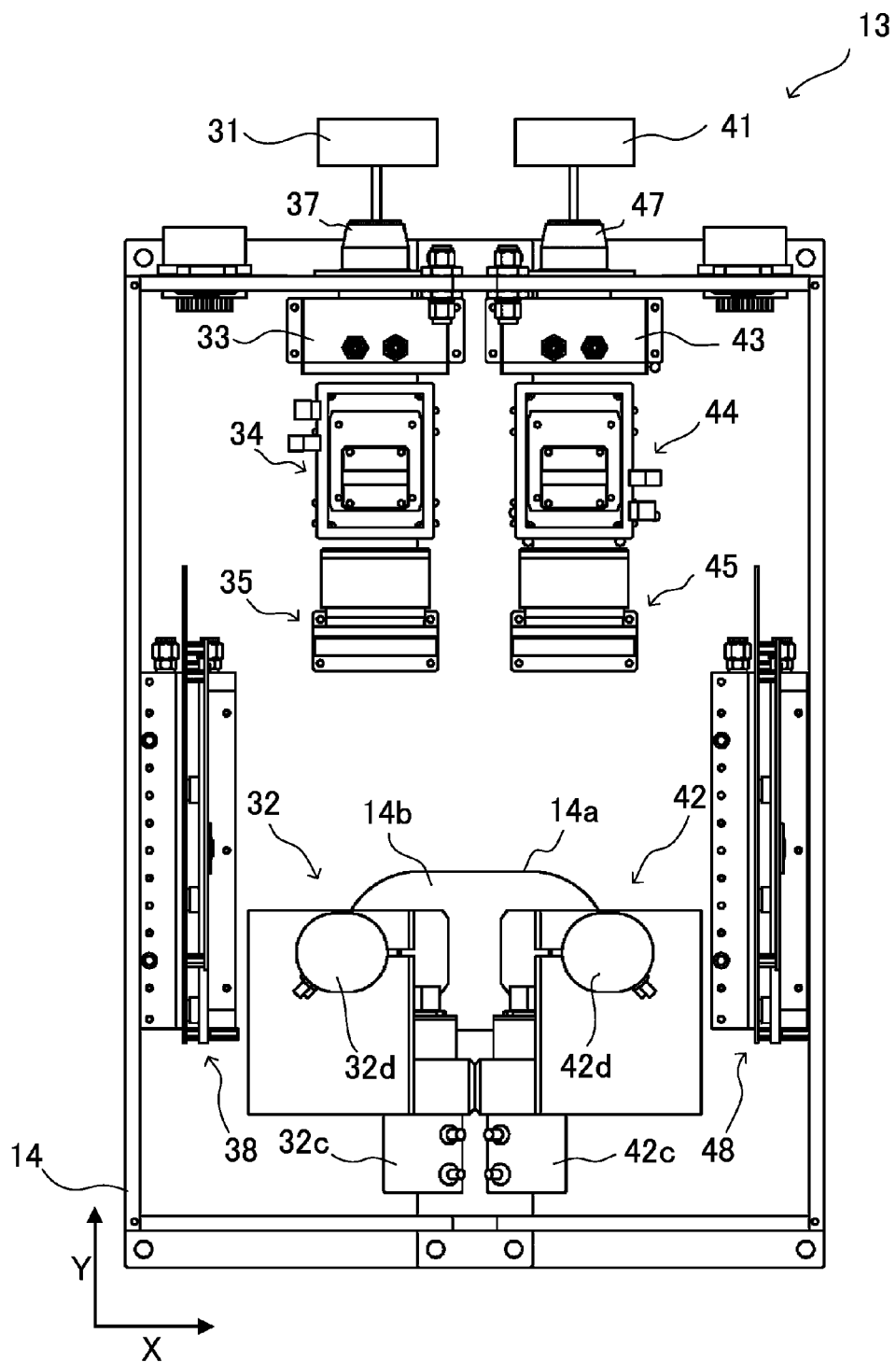
FIG. 5 is a plane cross-sectional view of an irradiation device.

As shown in FIG. 5, the irradiation device 13 includes: a first laser source 31, a second laser source 41, a first aperture 33, a second aperture 43, a first focus control unit 34, a second focus control unit 44, a first adjustment lens 35, a second adjustment lens 45, the first galvano scanner 32, and the second galvano scanner 42. Hereinafter, along pathways of the laser beams L1 and L2, relatively, a side close to the first laser source 31 or the second laser source 41 is taken as an upstream side, and a side far away from the first laser source 31 or the second laser source 41 is taken as a downstream side.

The first laser source 31 and the second laser source 41 respectively generate the laser beam L1 and the laser beam L2. As long as the laser beams L1 and L2 can sinter or fuse the material powder, the laser beams L1 and L2 may be, for example, fiber lasers, $CO_2$ lasers, or YAG lasers. In the embodiment, as the laser beams L1 and L2, fiber lasers are used. As described later, in the embodiment, the first galvano scanner 32 scans the laser beam L1 generated by the first laser source 31, and the second galvano scanner 42 scans the laser beam L2 generated by the second laser source 41. However, a laser beam generated by one laser source may be divided, and respectively scanned by the first galvano scanner 32 and the second galvano scanner 42.

The first aperture 33, the second aperture 43, the first focus control unit 34, the second focus control unit 44, the first adjustment lens 35, the second adjustment lens 45, the first galvano scanner 32, and the second galvano scanner 42 according to the embodiment are integrally disposed inside a housing 14 having an opening portion 14a on a bottom surface. In the opening portion 14a, an irradiation device window 14b which is a transmission window of the laser beams L1 and L2 is arranged. The irradiation device window 14b is formed by a material which can transmit the laser beams L1 and L2. Specifically, according to the types of the laser beams L1 and L2, the material of the irradiation device window 14b is selected from quartz glass or borosilicate glass; crystal of germanium, silicon, zinc selenide, or potassium bromide; or the like.

In the housing 14, a first control board 38 which is electrically connected to the first galvano scanner 32 and the first focus control unit 34, and a second control board 48 which is electrically connected to the second galvano scanner 42 and the second focus control unit 44 are disposed. The first galvano scanner 32 includes a first X-axis galvano mirror 32a, a first X-axis actuator 32c, a first Y-axis galvano mirror 32b, and a first Y-axis actuator 32d. The second galvano scanner 42 includes a second X-axis galvano mirror 42a, a second X-axis actuator 42c, a second Y-axis galvano mirror 42b, and a second Y-axis actuator 42d.

The first laser source 31 and the second laser source 41 are respectively connected to the first aperture 33 and the second aperture 43 respectively via a first connector 37 and a second connector 47 which are disposed on a back surface of the housing 14. The first aperture 33 and the second aperture 43 are apertures which allows only center portions of the laser beam L1 from the first laser source 31 and the laser beam L2 from the second laser source 41 to pass through. The first aperture 33 and the second aperture 43 stabilize energy distribution of the laser beams L1 and L2.

The first focus control unit 34 includes a first focal point control lens 34a, and a first motor 34b which moves the first focal point control lens 34a backward and forward. The second focus control unit 44 includes a second focal point control lens 44a, and a second motor 44b which moves the second focal point control lens 44a backward and forward. The first focal point control lens 34a and the second focal point control lens 44a in the embodiment are plano-convex lenses which have a plane on the upstream side and have a convex surface on the downstream side. The first focal point control lens 34a and the second focal point control lens 44a can be respectively moved backward and forward along the pathways of the laser beams L1 and L2 by the first motor 34b and the second motor 44b. The first focal point control lens 34a and the second focal point control lens 44a respectively adjust focal positions of the laser beams L1 and L2 which are transmitted through the first focal point control lens 34a and the second focal point control lens 44a.

The laser beams L1 and L2 which are respectively transmitted through the first focal point control lens 34a and the second focal point control lens 44a are respectively condensed by the first adjustment lens 35 and the second adjustment lens. The first adjustment lens 35 and the second adjustment lens 45 are plano-convex lenses which have a plane on the upstream side and have a convex surface on the downstream side. The first adjustment lens 35 and the second adjustment lens 45 can be manually adjusted in position, and fine-tune an error of the optical system which may occur during the assembly of a device and the like.

Figure 6:
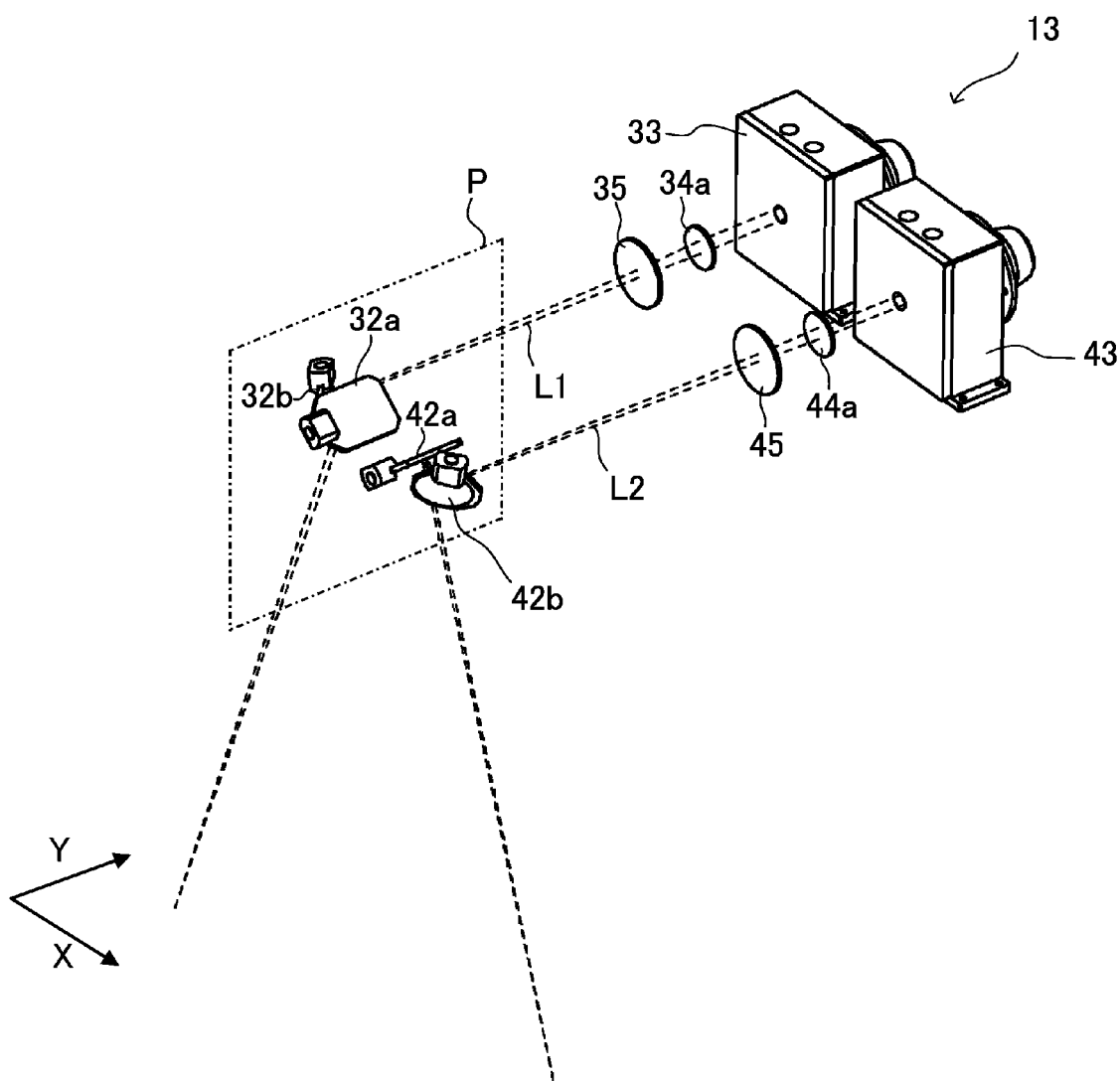
FIG. 6 is a perspective view showing a part of the irradiation device.

As shown in FIG. 6, the first galvano scanner 32 performs two-dimensional scanning on the laser beam L1 which is transmitted through the first adjustment lens 35. Specifically, the laser beam L1 is reflect by the first X-axis galvano mirror 32a rotated by the first X-axis actuator 32c and is scanned in an X-axis direction of the molding region R, and the laser beam L1 is reflected by the first Y-axis galvano mirror 32b rotated by the first Y-axis actuator 32d and is scanned in a Y-axis direction of the molding region R. Here, the first galvano scanner 32 is desirably configured to be capable of irradiating any position on the molding region R. In other words, an irradiable range of the first galvano scanner 32 desirably includes the entire molding region R.

The second galvano scanner 42 performs two-dimensional scanning on the laser beam L2 which is transmitted through the second adjustment lens 45. Specifically, the laser beam L2 is reflected by the second X-axis galvano mirror 42a rotated by the second X-axis actuator 42c and is scanned in the X-axis direction of the molding region R, and the laser beam L2 is reflected by the second Y-axis galvano mirror 42b rotated by the second Y-axis actuator 42d and is scanned in the Y-axis direction of the molding region R. Here, the second galvano scanner 42 is desirably configured to be capable of irradiating any position on the molding region R. In other words, an irradiable range of the second galvano scanner 42 desirably includes the entire molding region R.

In FIG. 6, a symmetry plane P is a plane which has the same distances from optical axes of the laser beams L1 and L2 respectively passing through the first adjustment lens 35 and the second adjustment lens 45, and is perpendicular to the molding region R. The first X-axis galvano mirror 32a and the first Y-axis galvano mirror 32b of the first galvano scanner 32, and the second X-axis galvano mirror 42a and the second Y-axis galvano mirror 42b of the second galvano scanner 42 are disposed to be plane-symmetric with each other with respect to the symmetry plane P.

Preferably, reflect positions of the laser beams L1 and L2 in galvano mirrors on the downstream side of the first galvano scanner 32 and the second galvano scanner 42, that is, in the first X-axis galvano mirror 32a and the second X-axis galvano mirror 42a in the embodiment, are configured to be located above an approximately middle position of the molding region R.

In the irradiation device 13 having the above-described configuration, the first X-axis galvano mirror 32a which is the galvano mirror on the downstream side of the first galvano scanner 32 and the second X-axis galvano mirror 42a which is the galvano mirror on the downstream side of the second galvano scanner 42 can be arranged closer to each other. Accordingly, an incidence angle of the laser beam L1 scanned by the first galvano scanner 32 and an incidence angle of the laser beam L2 scanned by the second galvano scanner 42 approximately coincide with each other if the irradiation positions are the same. Furthermore, regardless of whether the first galvano scanner 32 or the second galvano scanner 42 is used for the scanning, the shape and energy density of irradiation spots of the laser beams L1 and L2 irradiated to a predetermined position are approximately constant, thus stabilizing the molding quality.

Moreover, the configuration of the irradiation device 13 which is shown above is an example, and a configuration may be used as long as the configuration includes two or more scanners. For example, the irradiation device may include four galvano scanners as scanners. Moreover, an irradiable range of each laser beam in all the scanners desirably includes the entire molding region R. In this way, regardless of the shape or position of the three-dimensional molded object, a plurality of scanners can be used simultaneously. In addition, processing during the division of the irradiation region S described later becomes easy.

When the solidified layer 83 is formed by the irradiation device 13, smoke which is referred to as fumes is generated. The fumes pollute an optical member such as the chamber window 1a or the like and shield the laser beams L1 and L2, causing a molding failure. Therefore, the inert gas supply and discharge mechanism supplies the inert gas to the chamber 1 and discharges the inert gas containing fumes to maintain the inside of the chamber 1 in a clean state.

Figure 7:
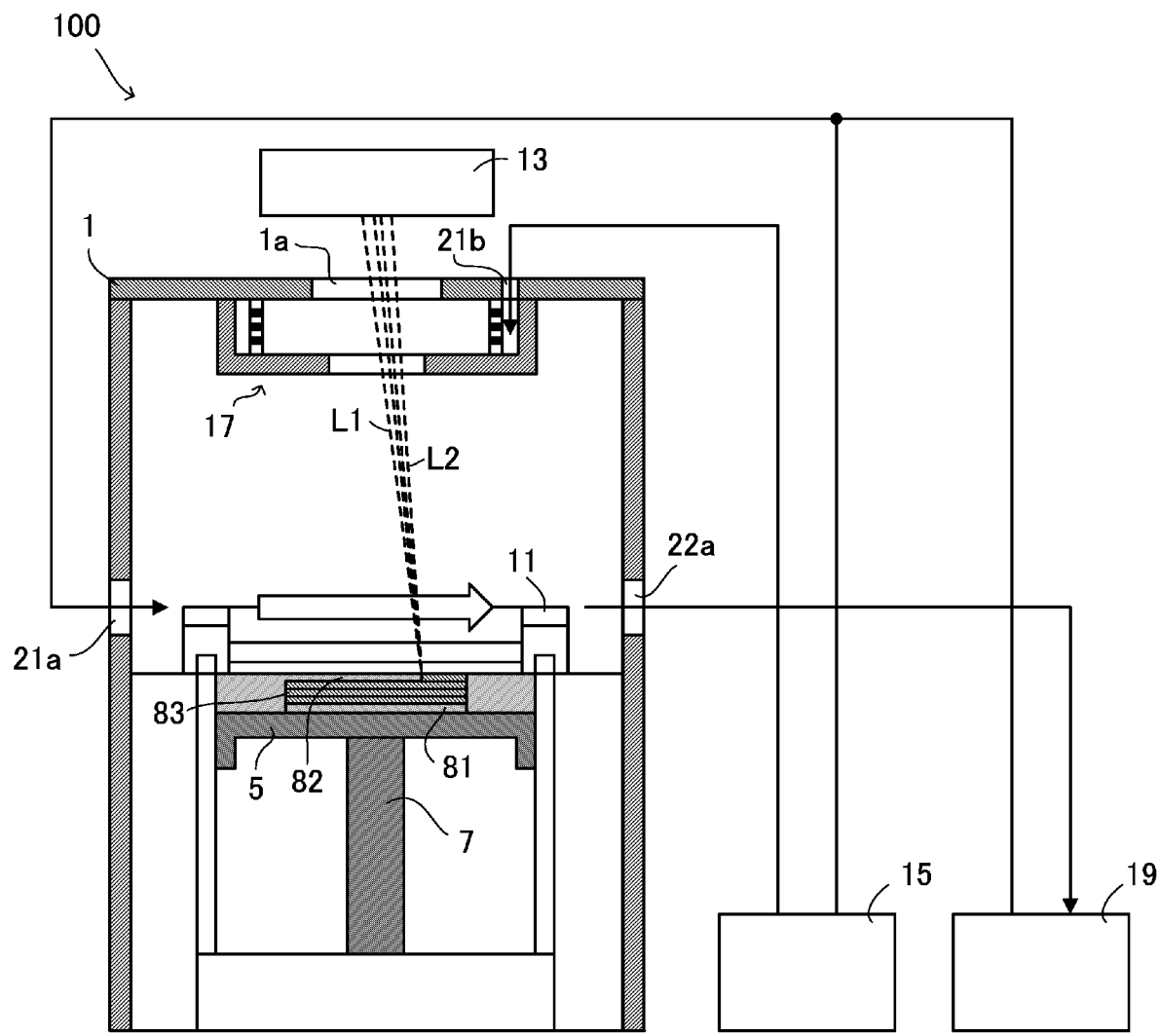
FIG. 7 is an aligned cross-sectional view taken along a line A-A of FIG. 1, and is a schematic configuration diagram of an inert gas supply and discharge mechanism.

FIG. 7 is a side view of the lamination molding apparatus 100 of the embodiment. As shown in FIG. 7, the inert gas supply and discharge mechanism of the embodiment includes an inert gas supplier 15, a fume collector 19, supply ports 21a and 21b, a discharge port 22a, and piping which connects each portion.

The inert gas supplier 15 supplies the inert gas having a predetermined concentration to the chamber 1. For example, the inert gas supplier 15 is an inert gas generator which extracts the inert gas from surrounding air, or a gas cylinder in which the inert gas is stored. In the embodiment, the inert gas supplier 15 is a PSA nitrogen generator.

After removing most of the fumes from the inert gas which is discharged from the chamber 1, the fume collector 19 sends the inert gas back to the chamber 1. For example, the fume collector 19 is an electric dust collector or a filtration dust collector. In the embodiment, the fume collector 19 is a dry-type electric dust collector.

The supply port 21a is arranged on a side wall of the chamber 1, and is connected to the inert gas supplier 15 and the fume collector 19. Via the supply port 21a, the inert gas having a predetermined concentration is supplied from the inert gas supplier 15 to the chamber 1. In addition, via the supply port 21a, the inert gas from which most of the fumes are removed by the fume collector 19 is sent back to the chamber 1. The supply port 21b is arranged on the upper surface of the chamber 1, and is connected to the inert gas supplier 15. Via the supply port 21b, the inert gas is supplied toward the inert gas supply space 17d of the fume diffusing device 17. In order to prevent the fumes from adhering to the chamber window 1a, it is desirable that only the inert gas supplier 15 be connected to the supply port 21b.

The discharge port 22a is arranged on a side wall of the chamber 1 facing the side wall on which the supply port 21a is arranged, and is connected to the fume collector 19. Via the discharge port 22a, the inert gas containing fumes is discharged to the fume collector 19.

According to the configuration, as shown by a hollow arrow in FIG. 7, directly above the irradiation region S, a flow of the inert gas from a left side toward a right side in figure is formed. The fumes are discharged from the chamber 1 with the flow of the inert gas.

Moreover, the inert gas supply and discharge mechanism may be another form, and is not limited to the embodiment which is specifically shown above. For example, positions, shapes, and the number of the supply port and the discharge port are not limited, as long as the supply port and the discharge port are disposed in a manner that when the solidified layer 83 is formed, the inert gas flows in a constant direction directly above the irradiation region S. Moreover, as long as the flow direction of the inert gas is constant from the beginning of the formation of one solidified layer 83 to the completion of the formation of this solidified layer 83, the flow direction may be different for each solidified layer 83.

Figure 8:
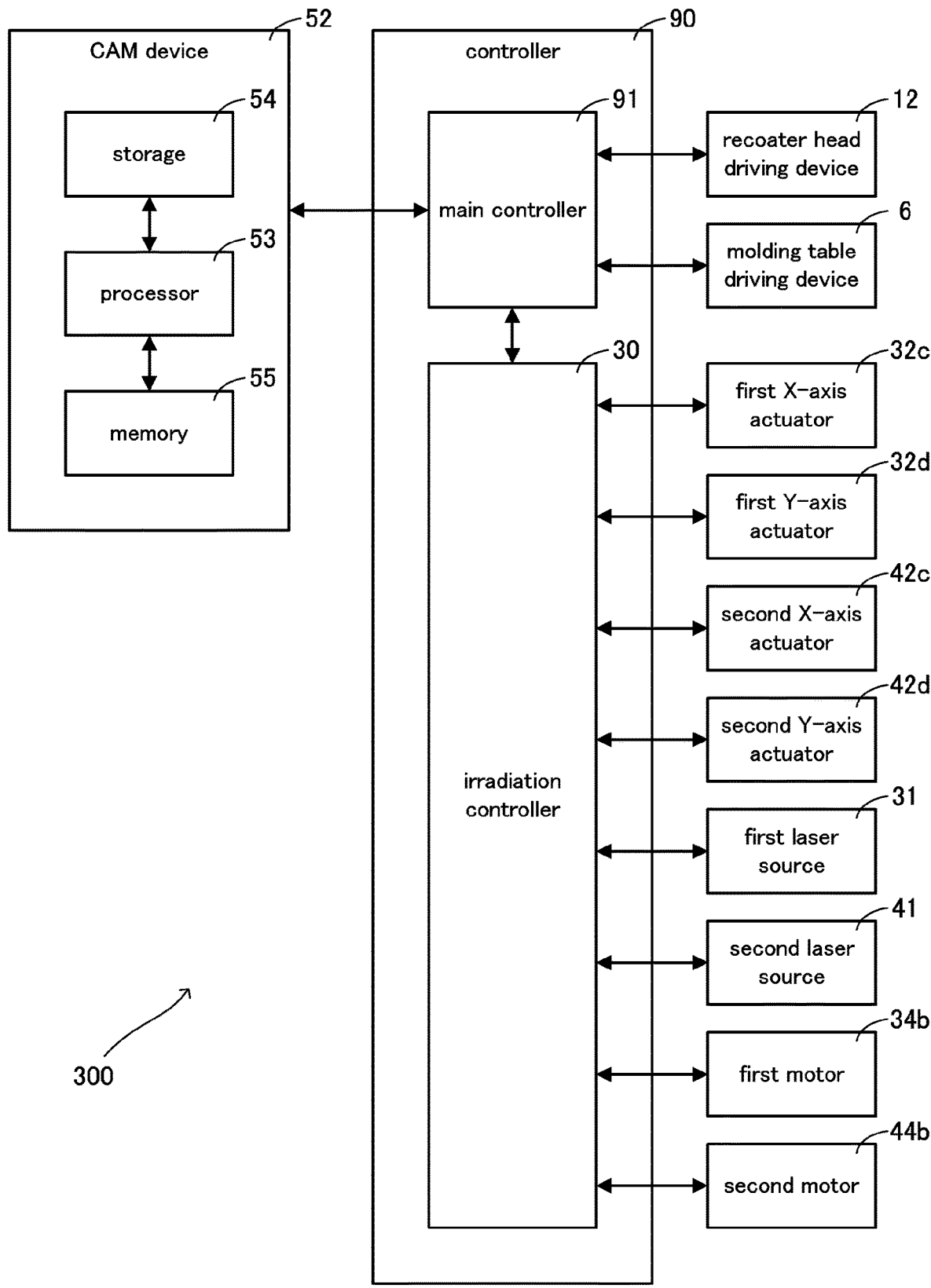
FIG. 8 is a block diagram showing a computer aided manufacturing device and a controller.

In FIG. 8, configurations of a computer aided manufacturing (CAM) device 52 and a controller 90 of the lamination molding apparatus 100 are schematically shown. Moreover, in the specification, a system including the lamination molding apparatus 100 and the CAM device 52 is referred to as a lamination molding system 300.

Based on molding shape data such as CAD data which specifies the shape of the desirable three-dimensional molded object, the type of material, a laser irradiation condition, and the like, the CAM device 52 creates a project file in which a command for the lamination molding apparatus 100 is defined. Specifically, the CAM device 52 is a computer in which CAM software is installed, and has: a processor 53 which performs desirable processing, a storage 54 in which data and the like required for the processing are stored, and a memory 55 which stores a numerical value and data that are required to be temporarily stored during the processing. During the creation of the project file, the three-dimensional molded object is divided by a predetermined thickness, and for each layer which is divided, that is, for each divided layer, the shape of the irradiation region S is calculated. The CAM device 52 divides the irradiation region S into a plurality of divided regions for each divided layer. Then, the CAM device 52 decides an irradiation order of the divided regions in a manner that the laser beams L1 and L2 are simultaneously irradiated to the divided regions that are not adjacent, and the laser beams L1 and L2 are not simultaneously irradiated to the divided regions that are adjacent. The project file created in this way is sent to the controller 90. The details of a dividing method of the irradiation region S are described later.

The controller 90 includes a main controller 91 and an irradiation controller 30. The main controller 91 includes a processor, a storage, and a memory, and controls each device according to the project file created by the CAM device 52.

Specifically, the main controller 91 controls the recoater head driving device 12 and the molding table driving device 6. In addition, the main controller 91 sends, to the irradiation controller 30, a molding program including commands for the irradiation positions of the laser beams L1 and L2 in the project file. The irradiation controller 30 includes a processor, a storage, and a memory, and controls the irradiation device 13 according to the molding program sent from the main controller 91. Specifically, the irradiation controller 30 controls rotational angles of the first X-axis actuator 32c and the first Y-axis actuator 32d to control the irradiation position of the laser beam L1, controls the first laser source 31 to switch on/off and intensity of the laser beam L1, and controls the position of the first motor 34b to control the focal position of the laser beam L1. In addition, the irradiation controller 30 controls rotational angles of the second X-axis actuator 42c and the second Y-axis actuator 42d to control the irradiation position of the laser beam L2, controls the second laser source 41 to switch on/off and intensity of the laser beam L2, and controls the position of the second motor 44b to control the focal position of the laser beam L2. Moreover, as long as the controller 90 is configured so as to control, based on the command of the project file created by the CAM device 52, the irradiation device 13 to scan the laser beams L1 and L2 in each of the divided regions during the formation of the solidified layer 83, the controller 90 is not limited to the above-described embodiment.

Figure 9:
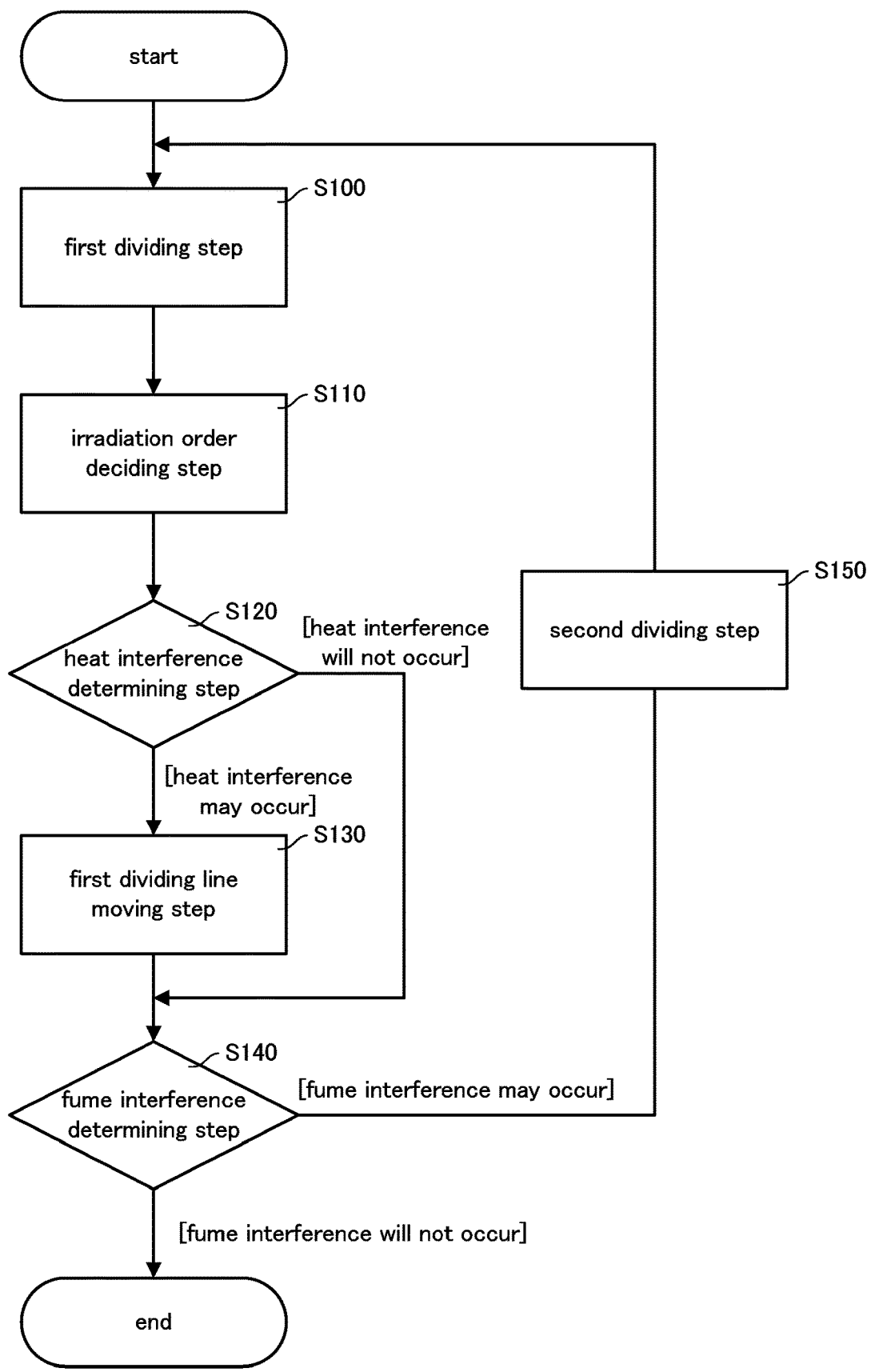
FIG. 9 is a flow diagram showing a dividing method of an irradiation region.

Here, the dividing method of the irradiation region S when the CAM device 52 creates the project file is described. As shown in FIG. 9, the dividing method of the irradiation region S in a lamination molding method of the embodiment includes: a first dividing step, an irradiation order deciding step, a heat interference determining step, a first dividing line moving step, a fume interference determining step, and a second dividing step.

Figure 10:
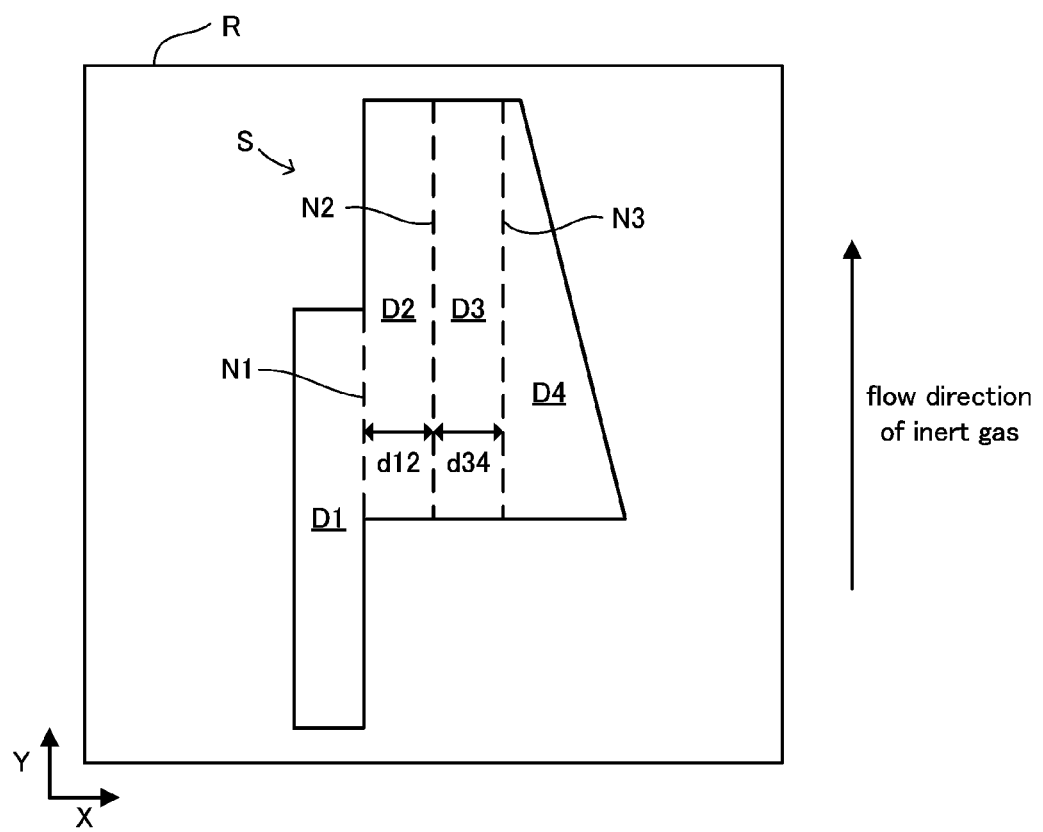
FIG. 10 illustrates a first dividing step.

In FIG. 10, an example of the irradiation region S on a predetermined divided layer is shown. As described before, the molding region R of the embodiment has a rectangular shape including sides extending in the X-axis direction and sides extending in the Y-axis direction. The irradiation region S is an irradiation area of the laser beams L1 and L2 that exists in the molding region R. In the embodiment, the flow direction of the inert gas of the irradiation region S is a direction parallel to the Y-axis direction and directed from a lower side to an upper side of FIG. 10. Moreover, a flow direction of the inert gas in the processing according to the division of the irradiation region S is not required to exactly coincide with an actual flow direction of the inert gas in the lamination molding apparatus 100, and may be a direction estimated from the positions, shapes, and the like of the supply port and the discharge port of the inert gas supply and discharge mechanism.

As shown in FIG. 10, firstly, the first dividing step (S100) is performed. In the dividing step, the irradiation region S is divided to 2n-1 or more divided regions by a plurality of first dividing lines in a manner that irradiation time of each of the divided regions to which the laser beams are simultaneously irradiated becomes equal. As described before, n is the number of the scanners. Hereinafter, the number of the divided regions which are divided is simply referred to as the number of divisions. Moreover, the irradiation time refers to the time from the beginning of the irradiation of a laser beam L to an irradiation region S or a divided region to the completion of the formation of the solidified layer 83 according to said irradiation region S or said divided region and the termination of the irradiation of the laser beam L.

If the number of divisions of the irradiation region S is equal to or more than 2n-1, the irradiation can be simultaneously performed on the plurality of divided regions that are not adjacent using n scanners in at least a part of a period from the formation beginning to the formation completion of the solidified layer 83 according to said irradiation region S. In addition, if the number of divisions of the irradiation region S is n×m (herein, m is an integer equal to or greater than 2), the irradiation can be simultaneously performed on the plurality of divided regions that are not adjacent using n scanners for a period longer than the period from the formation beginning to the formation completion of the solidified layer 83 according to said irradiation region S. Particularly, if the number of divisions of the irradiation region S is n×m, and the irradiation time of the divided regions to which the laser beams are simultaneously irradiated is substantively the same, the irradiation can be simultaneously performed using n scanners in almost the entire period from the formation beginning to the formation completion of the solidified layer 83 according to said irradiation region S. Therefore, it is desirable that the number of divisions in the first dividing step be n×m. In addition, from the viewpoint of facilitation of the processing, it is desirable that the number of divisions in the first dividing step be 2n. In the embodiment, the number of the scanners is 2, and in the first dividing step, the irradiation region S is divided to four divided regions D1, D2, D3, and D4 by a plurality of first dividing lines N1, N2, and N3.

In the lamination molding, there is substantively a proportional relationship between the irradiation time and the area. In a precise sense, the time for the irradiation positions of the laser beams to be moved from a scan line to the next scan line is increased according to the number of the scan lines, and thus in an irradiation region including many short scan lines, the irradiation time slightly becomes longer with respect to the area, but the difference is slight. Therefore, in the first dividing step, when the irradiation region S is divided in a manner that the irradiation time of each of the divided regions to which the laser beams are simultaneously irradiated becomes equal, specifically, the irradiation region S may be divided in a manner that the area of each of the divided regions to which the laser beams are simultaneously irradiated becomes equal. In addition, in the disclosure, "the irradiation time is equal" and "the area is equal" indicate that the irradiation time and the area may be substantively equal. For example, among the divided regions which are simultaneously irradiated, a value of {(the irradiation time or the area according to the smallest divided region)/(the irradiation time or the area according to the largest divided region)} is preferably equal to or greater than 0.90, and more preferably equal to or greater than 0.95. In addition, in the first dividing step, it is not required that the irradiation time or the area of all the divided regions is set to be substantively equal, and the irradiation time or the area of each of the divided regions to which the laser beams are not simultaneously irradiated may not be equal. Specifically, in the first dividing step of the embodiment, the irradiation region S is divided in a manner that the irradiation time and the area of all the divided regions D1, D2, D3, and D4 become substantively equal, but it is sufficient if the irradiation time and the area are substantively equal in each of a group of the divided region D1 and the divided region D3 and a group of the divided region D2 and the divided region D4. For example, the irradiation time and the area of the divided region D1 and the divided region D2 which are not simultaneously irradiated may be different.

Moreover, the first dividing lines are preferably set along the flow direction of the inert gas. That is, in the embodiment, the first dividing lines N1, N2, and N3 are set parallel to the Y-axis direction. Accordingly, it can be suppressed that when a predetermined divided region is irradiated, the fumes generated in another divided region that is simultaneously irradiated interfere with the laser beam.

After the first dividing step, the irradiation order deciding step (S110) is performed. In the irradiation order deciding step, in the divided regions D1, D2, D3, and D4, an irradiation order of the divided regions D1, D2, D3, and D4 in the solidifying step described later is decided in a manner that the laser beams L1 and L2 are simultaneously irradiated to the nonadjacent divided regions, and the laser beams L1 and L2 are not simultaneously irradiated to the adjacent divided regions. Specifically, it is set that the laser beams L1 and L2 are simultaneously irradiated to the group of the divided region D1 and the divided region D3, and to the group of the divided region D2 and the divided region D4. In the embodiment, the divided region D1 and the divided region D3 are decided as divided regions which are the first to be simultaneously irradiated with the laser beams L1 and L2, and the divided region D2 and the divided region D4 are decided as divided regions which are the second to be simultaneously irradiated with the laser beams L1 and L2. Moreover, in the embodiment, the irradiation order deciding step is implemented immediately following the first dividing step, but it is sufficient if the group of the divided regions which are simultaneously irradiated can be grasped in subsequent steps immediately following the first dividing step. That is, the timing for implementing the irradiation order deciding step is not limited to immediately following the first dividing step.

After the first dividing step, the heat interference determining step (S120) is performed. In the heat interference determining step, it is determined whether the magnitude of a shortest distance between the divided regions to which the laser beams L1 and L2 are simultaneously irradiated is equal to or greater than a predetermined threshold value. When the magnitude of the shortest distance between the divided regions which are simultaneously irradiated is smaller than the threshold value, the irradiation positions of the plurality of laser beams L1 and L2 may be close to each other, and there is a risk that heat interference occurs. Moreover, when the number of divisions is equal to or smaller than 2n, the magnitude of an interval between the adjacent first dividing lines coincides with the magnitude of the shortest distance between the divided regions which are simultaneously irradiated. Therefore, when the number of divisions is equal to or less than 2n, in the heat interference determining step, whether the magnitude of the interval between the adjacent first dividing lines is equal to or greater than the predetermined threshold value may be determined to determine whether the heat interference may occur. In the embodiment, by comparing the magnitude of an interval d12 between the first dividing line N1 and the first dividing line N2 and the magnitude of an interval d34 between the first dividing line N2 and the first dividing line N3 with a predetermined threshold value t, it is determined whether the heat interference may occur. When either the interval d12 or the interval d34 is smaller than the threshold value t, the first dividing line moving step (S130) is implemented. When both the interval d12 and the interval d34 are equal to or greater than the threshold value t, the process proceeds to the next step without implementing the first dividing line moving step.

Figure 11:
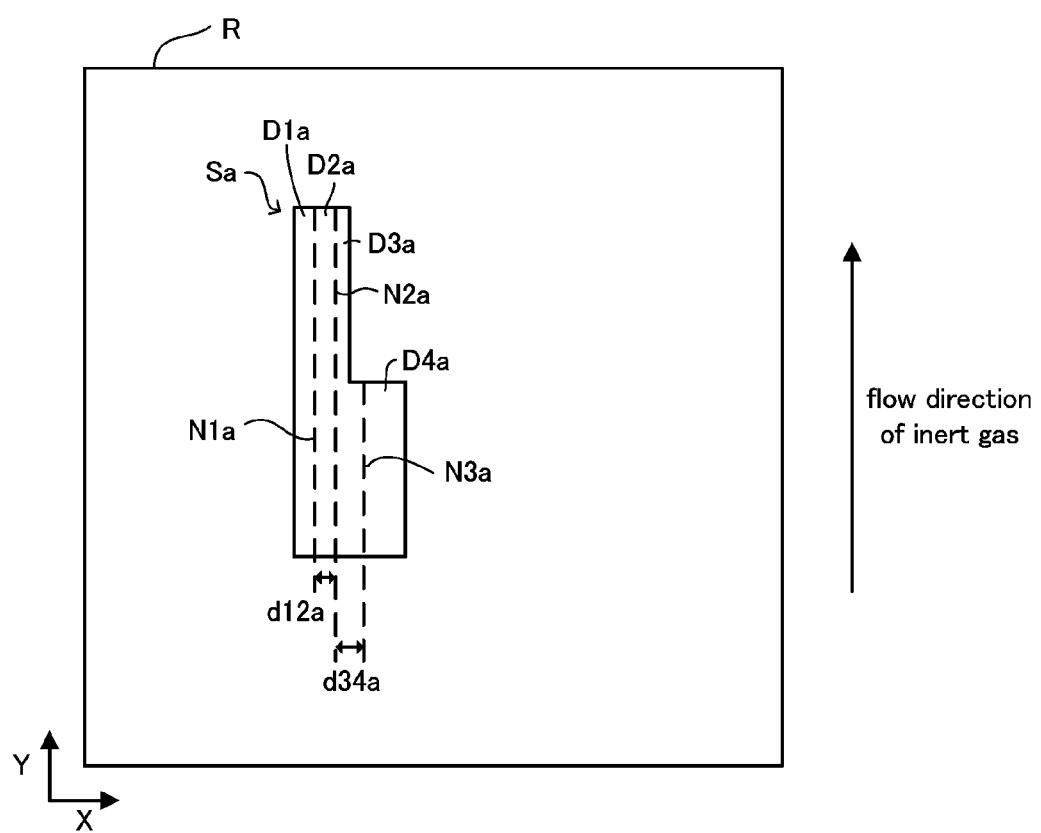
FIG. 11 illustrates a heat interference determining step.

In FIG. 11, an example of an irradiation region Sa in which the heat interference may occur is shown. In the example, the number of the scanners is 2, and the number of divisions is 4. The irradiation region Sa is divided to four divided regions D1a, D2a, D3a, and D4a by first dividing lines N1a, N2a, and N3a. At this time, the magnitude of an interval dl2a between the first dividing line N1a and the first dividing line N2a, and the magnitude of an interval d34a between the first dividing line N2a and the first dividing line N3a is smaller than the threshold value t, and it is determined that the heat interference may occur.

Figure 12:
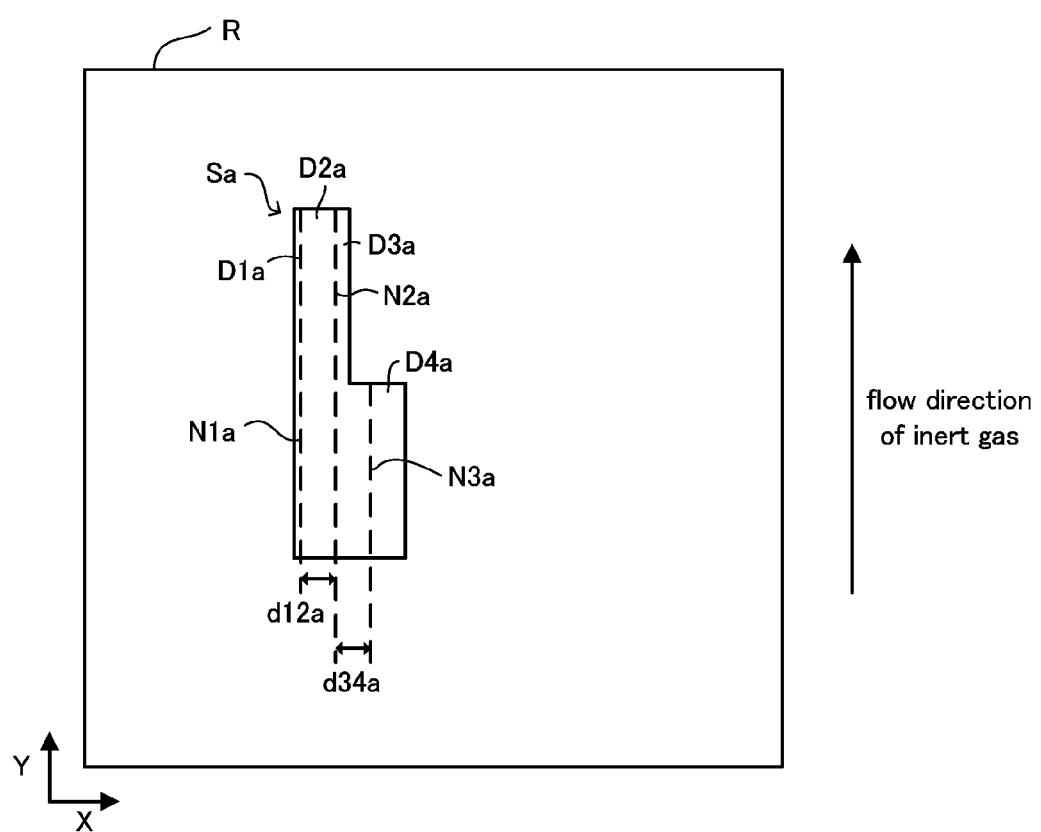
FIG. 12 illustrates a first dividing line moving step.

When it is determined that the heat interference may occur in the heat interference determining step, the first dividing line moving step is performed. In the first dividing line moving step, at least one of the first dividing lines is moved to a direction perpendicular to the first dividing lines in a manner that the magnitude of the shortest distance between the divided regions to which the laser beams L1 and L2 are simultaneously irradiated is equal to or greater than the threshold value t. In the embodiment, specifically, the first dividing line N1a is moved to a left side in figure, and the first dividing line N3a is moved to a right side in figure in a manner that the magnitude of the interval d12a and the magnitude of the interval d34a are equal to or greater than the threshold value t, and preferably become the threshold value t. FIG. 12 shows the divided regions D1a, D2a, D3a, and D4a after the first dividing line moving step.

The first dividing line moving step may cause that the irradiation time of each of the divided regions to which the laser beams are simultaneously irradiated becomes not equal. In addition, depending on the shape of the divided regions and the value of the threshold value, the first dividing line may not pass over the irradiation region S, and the number of divisions may be reduced. That is, because of the first dividing line moving step, the molding speed may be reduced slightly. Meanwhile, by implementing the heat interference determining step and the first dividing line moving step, the occurrence of the heat interference in the solidifying step can be suppressed, and a higher-quality three-dimensional molded object can be formed. When the heat interference determining step and the first dividing line moving step are implemented, the threshold value t is preferably a small value enough to suppress the heat interference in order to maintain a high molding speed and suppress the heat interference. The threshold value t may be set to any value according to the type of material and a molding condition, and is, for example, about 5 mm. The threshold value t is at least set to be equal to or greater than the magnitude of a spot diameter of the irradiated laser beams.

After the first dividing step, or after the heat interference determining step or after the first dividing line moving step preferably, the fume interference determining step (S140) is performed. Hereinafter, in the fume interference determining step, a divided region to be determined is referred to as a determined region, and a divided region to which the laser beam is irradiated simultaneously with the determined region is referred to as a simultaneous irradiation region. In the fume interference determining step, it is determined for each of the divided regions whether the fumes generated from the determined region may reach the simultaneous irradiation region, that is, whether a fume interference may occur. When it is determined that the fume interference may occur, the following point is calculated as one or more fume interference points: a point on the most downstream side in the flow direction in a region of the determined region that can be a generation source of the fumes which reach the simultaneous irradiation region, or a point on the most upstream side in the flow direction in a region of the simultaneous irradiation region that the fumes generated from the determined region can reach. When the fume interference may occur, the fumes generated in a predetermined divided region reaches a divided region to which the laser beam is irradiated simultaneously with the predetermined divided region and may obstruct the formation of the solidified layer 83.

Specifically, firstly, a first straight line V1 and a second straight line V2 are calculated. The first straight line V1 has a predetermined angle θ with respect to the flow direction of the inert gas and is in contact with the determined region on the upstream side in the flow direction, and the second straight line V2 has a predetermined angle −θ with respect to the flow direction of the inert gas and is in contact with the determined region on the upstream side in the flow direction. Then, it is determined whether the first straight line V1 or the second straight line V2 passes over the simultaneous irradiation region. When the first straight line V1 or the second straight line V2 passes over the simultaneous irradiation region, it is determined that the fume interference may occur, and the fume interference points are calculated. Here, the fume interference points are points on the most upstream side in the flow direction among points at which the first straight line V1 or the second straight line V2 intersects the simultaneous irradiation region.

Moreover, when the simultaneous irradiation region only exists on one side of the determined region, only one of the first straight line V1 and the second straight line V2 which extends on a side of the simultaneous irradiation region may be used for the determination. When the number of the scanners is 2, the simultaneous irradiation region only exists on one side of the determined region.

The angle θ may be set to any value according to the type of material, a molding condition, a flow speed of the inert gas, and the like. In the lamination molding apparatus 100 of the embodiment, the angle θ is preferably equal to or smaller than 30°. For example, the angle θ of the embodiment is 10°.

In addition, in the embodiment, with the assumption that the fumes which are generated in a predetermined irradiation position radially diffuse, the first straight line V1 and the second straight line V2 are used for the determination of the fume interference, but another line or region may be used for the determination. For example, a quadratic curve based on a predetermined function may be used for the determination.

Figure 13:
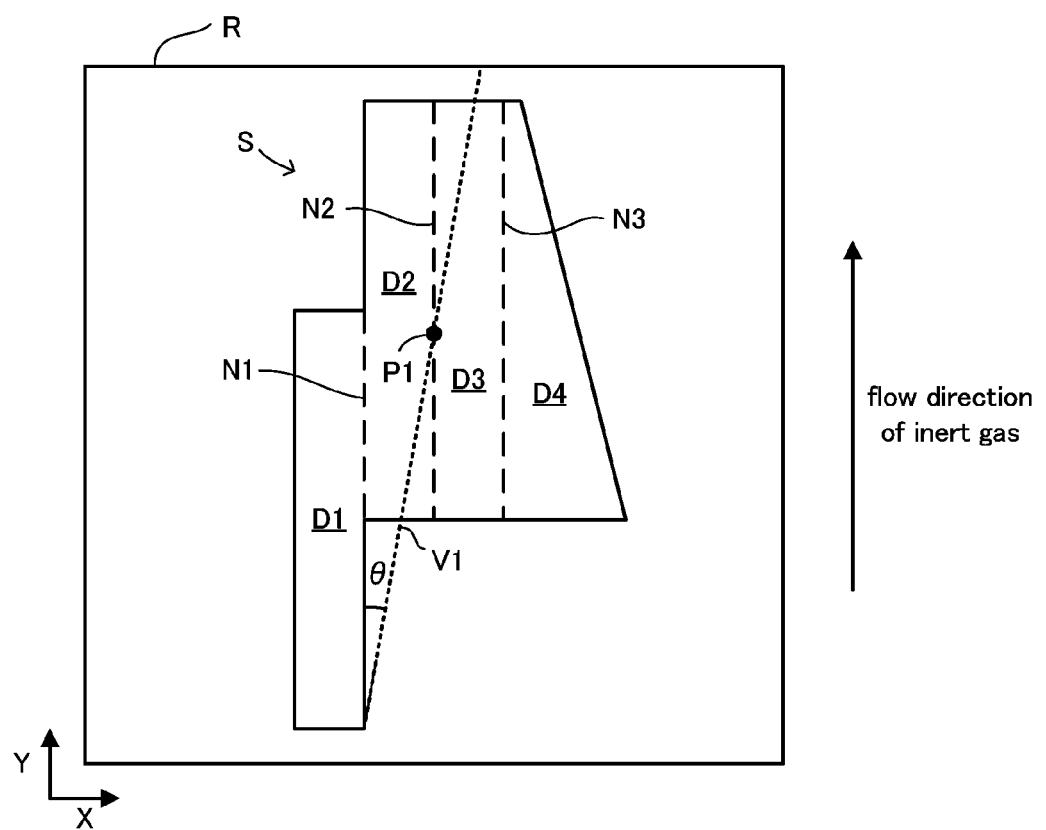
FIG. 13 illustrates a fume interference determining step.

In FIG. 13, the fume interference determining step in which the divided region D1 is taken as the determined region is shown. The simultaneous irradiation region of the divided region D1 is the divided region D3. Because the first straight line V1 which is in contact with the divided region D1 on the upstream side in the flow direction of the inert gas passes over the divided region D3 which is irradiated simultaneously with the divided region D1, it is determined that the fume interference may occur. Then, among points at which the first straight line V1 intersects the divided region D3, a point on the most upstream side in the flow direction is calculated as a fume interference point P1.

Figure 14:
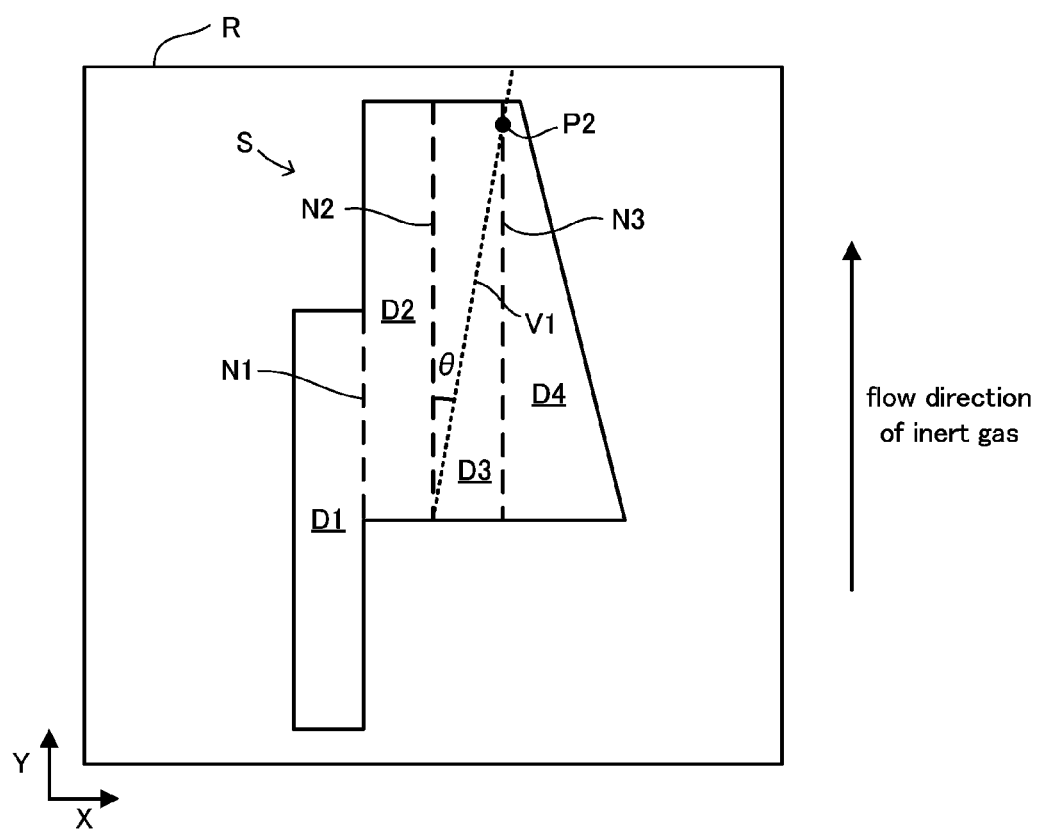
FIG. 14 illustrates the fume interference determining step.

In FIG. 14, the fume interference determining step in which the divided region D2 is taken as the determined region is shown. The simultaneous irradiation region of the divided region D2 is the divided region D4. Because the first straight line V1 which is in contact with the divided region D2 on the upstream side in the flow direction of the inert gas passes over the divided region D4 which is irradiated simultaneously with the divided region D2, it is determined that the fume interference may occur. Then, among points at which the first straight line V1 intersects the divided region D4, a point on the most upstream side in the flow direction is calculated as a fume interference point P2.

Figure 15:
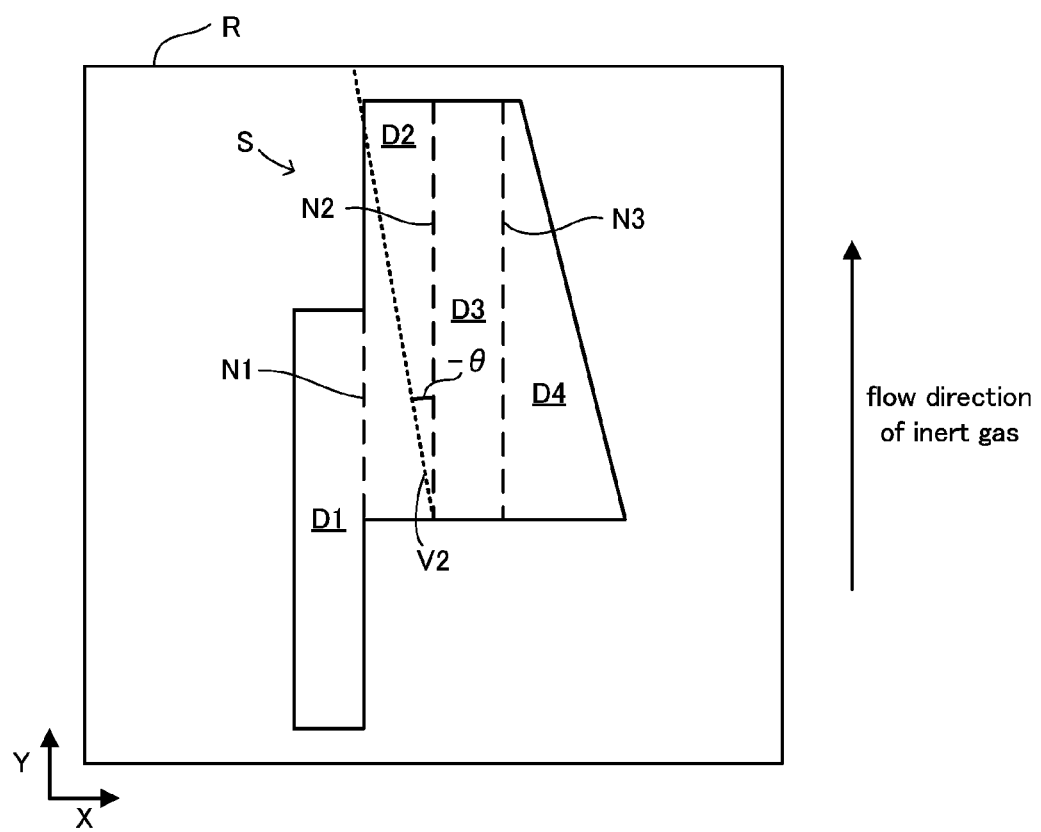
FIG. 15 illustrates the fume interference determining step.

In FIG. 15, the fume interference determining step in which the divided region D3 is taken as the determined region is shown. The simultaneous irradiation region of the divided region D3 is the divided region D1. Because the second straight line V2 which is in contact with the divided region D3 on the upstream side in the flow direction of the inert gas does not pass over the divided region D1 which is irradiated simultaneously with the divided region D3, it is determined that the fume interference will not occur.

Figure 16:
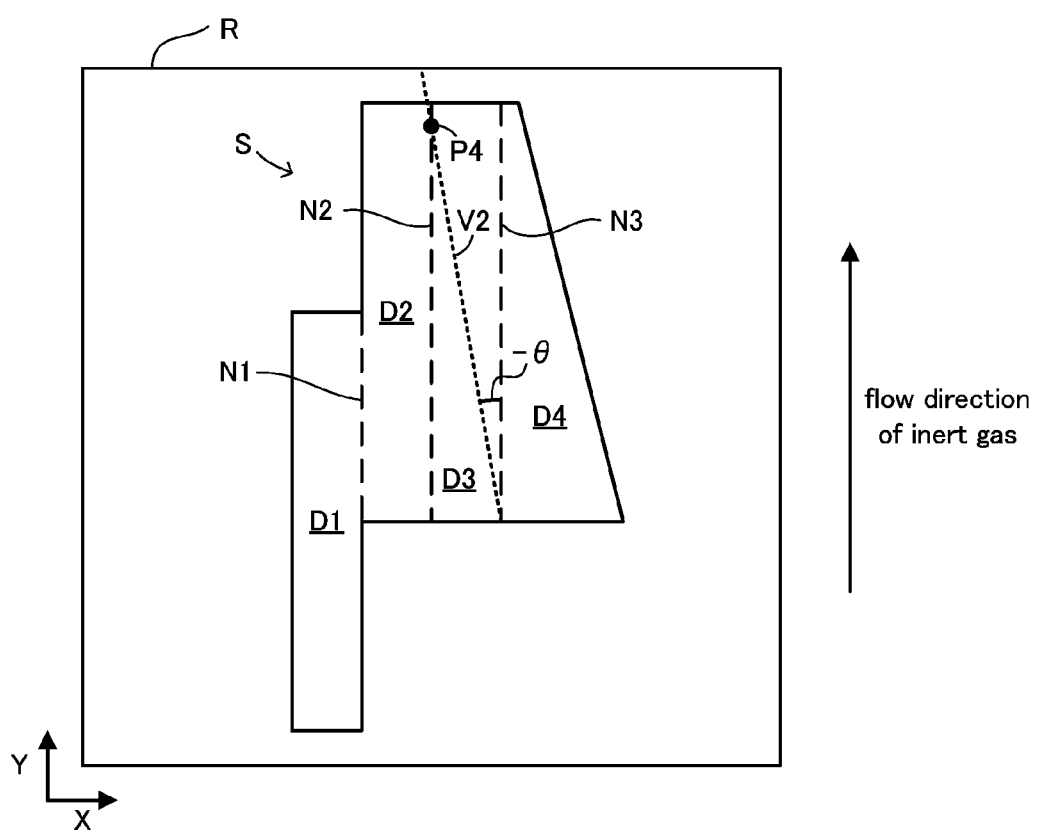
FIG. 16 illustrates the fume interference determining step.

In FIG. 16, the fume interference determining step in which the divided region D4 is taken as the determined region is shown. The simultaneous irradiation region of the divided region D4 is the divided region D2. Because the second straight line V2 which is in contact with the divided region D4 on the upstream side in the flow direction of the inert gas passes over the divided region D2 which is irradiated simultaneously with the divided region D4, it is determined that the fume interference may occur. Then, among points at which the second straight line V2 intersects the divided region D2, a point on the most upstream side in the flow direction is calculated as a fume interference point P4.

In this way, all the divided regions are taken as objects to be determined, and the fume interference determining step is performed. When it is determined that the fume interference will not occur in any one of the divided regions, the division of the irradiation region S on the predetermined divided layer is terminated.

Moreover, the determination of the fume interference may be performed by another aspect. For example, the determination of the fume interference may be performed according to a procedure described below. Firstly, a first straight line V1a and a second straight line V2a are calculated. The first straight line V1a has the predetermined angle θ with respect to the flow direction of the inert gas and is in contact with the simultaneous irradiation region on the downstream side in the flow direction, and the second straight line V2a has the predetermined angle −θ with respect to the flow direction of the inert gas and is in contact with the simultaneous irradiation region on the downstream side in the flow direction. Then, it is determined whether the first straight line V1a or the second straight line V2a passes over the determined region. When the first straight line V1a or the second straight line V2a passes over the determined region, it is determined that the fume interference may occur, and the fume interference points are calculated. Here, the fume interference points are points on the most downstream side in the flow direction among points at which the first straight line V1a or the second straight line V2a intersects the determined region.

Figure 17:
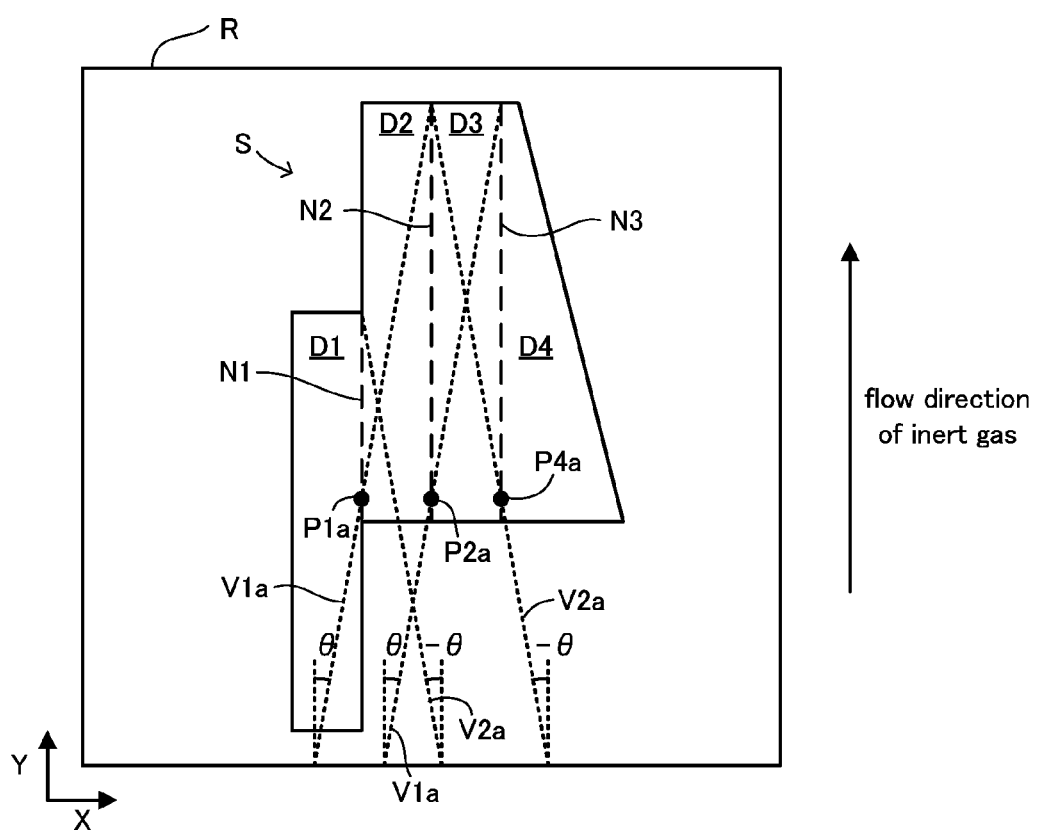
FIG. 17 illustrates another aspect of the fume interference determining step.

In FIG. 17, a fume interference determining step of another aspect is shown. When the divided region D1 is taken as the determined region, the simultaneous irradiation region of the divided region D1 is the divided region D3. Because the first straight line V1a which is in contact with the divided region D3 that is irradiated simultaneously with the divided region D1 on the downstream side in the flow direction of the inert gas passes over the divided region D1, it is determined that the fume interference may occur. Then, among points at which the first straight line V1a intersects the divided region D1, a point on the most downstream side in the flow direction is calculated as a fume interference point P1a. When the divided region D2 is taken as the determined region, the simultaneous irradiation region of the divided region D2 is the divided region D4. Because the first straight line V1a which is in contact with the divided region D4 that is irradiated simultaneously with the divided region D2 on the downstream side in the flow direction of the inert gas passes over the divided region D2, it is determined that the fume interference may occur. Then, among points at which the first straight line V1a intersects the divided region D2, a point on the most downstream side in the flow direction is calculated as a fume interference point P2a. When the divided region D3 is taken as the determined region, the simultaneous irradiation region of the divided region D3 is the divided region D1. Because the second straight line V2a which is in contact with the divided region D1 that is irradiated simultaneously with the divided region D3 on the downstream side in the flow direction of the inert gas does not pass over the divided region D3, it is determined that the fume interference will not occur. When the divided region D4 is taken as the determined region, the simultaneous irradiation region of the divided region D4 is the divided region D2. Because the second straight line V2a which is in contact with the divided region D2 that is irradiated simultaneously with the divided region D4 on the downstream side in the flow direction of the inert gas passes over the divided region D4, it is determined that the fume interference occurs. Then, among points at which the second straight line V2a intersects the divided region D4, a point on the most downstream side in the flow direction is calculated as a fume interference point P4a.

Figure 18:
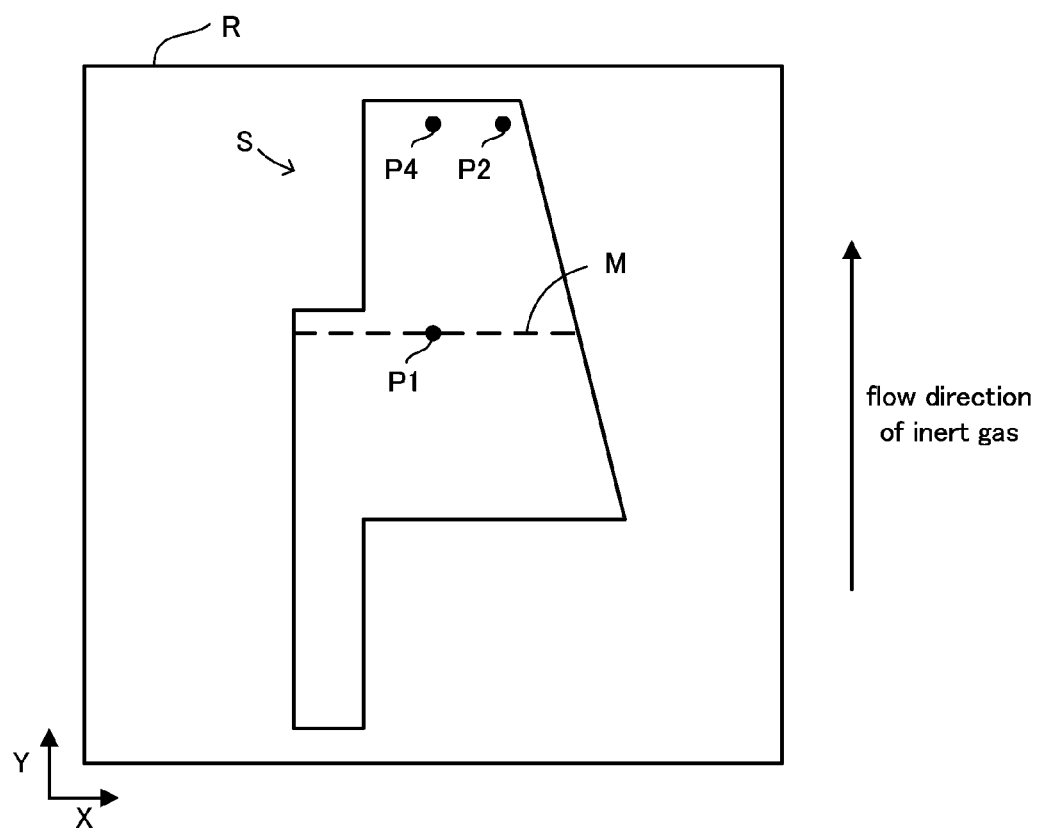
FIG. 18 illustrates a second dividing step.

When it is determined that the fume interference occurs in at least one divided region, that is, when at least one of the fume interference points exists, the second dividing step (S150) is performed. In the second dividing step, the irradiation region S is divided by a second dividing line M intersecting with the flow direction. Here, the second dividing line M is preferably orthogonal to the flow direction of the inert gas. In addition, the second dividing line M is desirably set to pass through a point on the most upstream side in the flow direction of the inert gas among the fume interference points. By the such second dividing line M, the division of the irradiation region S can be performed more efficiently. In the embodiment, the point on the most upstream side among the fume interference points P1, P2, and P4 is the fume interference point P1. Thus, as shown in FIG. 18, the irradiation region S is divided by the second dividing line M which passes through the fume interference point P1 and is orthogonal to the flow direction of the inert gas.

Figure 19:
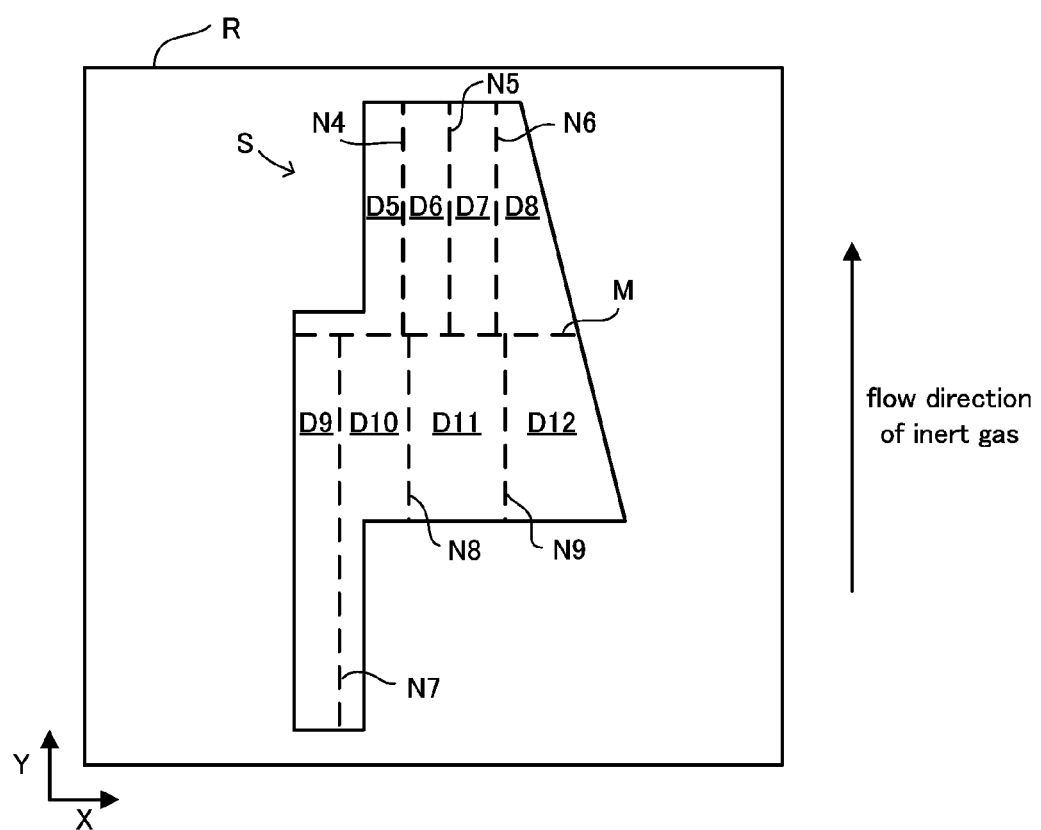
FIG. 19 illustrates the first dividing step which is performed once again after the second dividing step.

After the second dividing step, the first dividing step and the irradiation order deciding step are performed once again on each of the irradiation regions S divided by the second dividing line M. FIG. 19 shows the irradiation region S on which the second-time first dividing step is performed. The irradiation region S is divided to eight divided regions D5, D6, D7, D8, D9, D10, D11, and D12 by first dividing lines N4, N5, N6, N7, N8, and N9 and the second dividing line M. In the embodiment, because the laser beams L1 and L2 are simultaneously irradiated to each of a group of the divided region D5 and the divided region D7, a group of the divided region D6 and the divided region D8, a group of the divided region D9 and the divided region D11, and a group of the divided region D10 and the divided region D12, the division is performed in a manner that the irradiation time and even the area of each group become substantively equal. Moreover, during the irradiation order deciding step, the irradiation order is desirably decided in a manner that the irradiation is performed starting with the divided regions which are positioned on the downstream side of the inert gas, that is, the divided regions D5, D6, D7, and D8. For example, in the embodiment, the divided region D5 and the divided region D7 are decided as divided regions which are the first to be simultaneously irradiated with the laser beams L1 and L2, the divided region D6 and the divided region D8 are decided as divided regions which are the second to be simultaneously irradiated with the laser beams L1 and L2, the divided region D9 and the divided region D11 are decided as divided regions which are the third to be simultaneously irradiated with the laser beams L1 and L2, and the divided region D10 and the divided region D12 are decided as divided regions which are the fourth to be simultaneously irradiated with the laser beams L1 and L2.

After that, similarly, the heat interference determining step and the fume interference determining step are performed, the first dividing line moving step is performed once again when it is determined that the heat interference may occur, and the second dividing step is performed once again when it is determined that the fume interference may occur. The above procedure is repeated until it is determined that the fume interference will not occur. In this way, the divided regions of the irradiation region S according to the predetermined divided layer and the irradiation order of the divided regions are determinate. The above steps are performed for each irradiation region S according to each divided layer, and the project file is generated.

Figure 20:
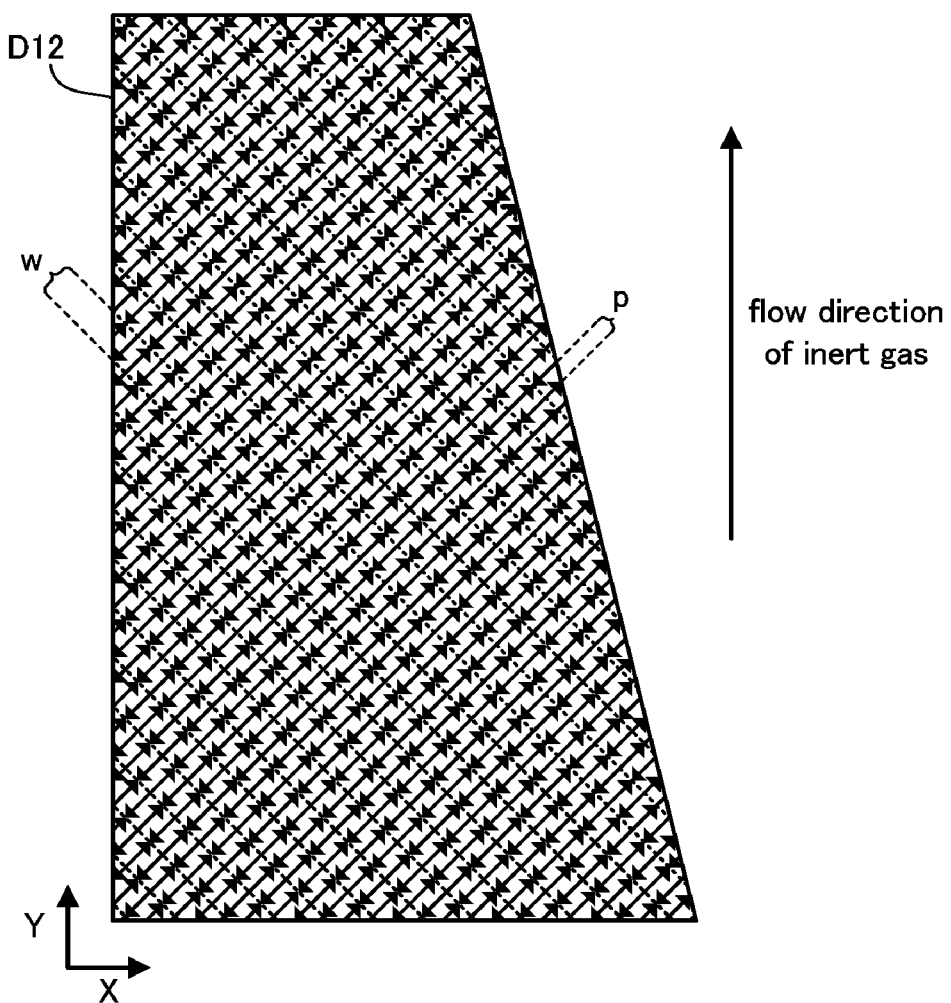
FIG. 20 is a view showing scan lines according to raster scanning.

Moreover, when the laser beams are irradiated to each of the divided regions, for example, the laser beams are raster-scanned. The project file also defines positions of scan lines according to the raster scanning and an irradiation order of the scan lines. Here, the divided region D12 is taken as an example to describe the raster scanning. FIG. 20 is an enlarged view of the divided region D12, and schematically shows the scan lines in the divided region D12. Firstly, the divided region D12 is divided to raster regions having a predetermined width w. Broken lines in FIG. 20 show dividing lines of the raster regions. Then, a scan line is set for each predetermined pitch p along a direction orthogonal to the longitudinal direction of the raster region. Solid arrows in FIG. 20 show scan directions of the scan lines, and the laser beams are scanned along the scan lines. The raster scanning is desirably performed from the downstream side toward the upstream side in the flow direction of the inert gas in order to suppress the influence of the fumes and perform the molding. Specifically, when the laser beams are raster-scanned with respect to the divided region D12 shown in FIG. 20, an upper-right raster region in figure is taken as a start point, a lower-left raster region in figure is taken as a terminal point, and the raster scanning is performed in order. In each of the raster regions, an upper-left scan line in figure is taken as a start point, a lower-right scan line in figure is taken as a terminal point, and the raster scanning is performed in order.

Next, based on the project file which is generated by dividing the irradiation region S according to the above-described procedure, a manufacturing method of a three-dimensional molded object which is performed by the lamination molding apparatus 100 is described. The manufacturing method of a three-dimensional molded object in the lamination molding method of the embodiment includes: a material layer forming step, a solidifying step, and an inert gas supplying step. In the material layer forming step, the material layer 82 is formed on the predetermined molding region R. In the solidifying step, the laser beams L1 and L2 which are scanned by n scanners (in the embodiment, two scanners) are irradiated to the predetermined irradiation region of the material layer 82, and the solidified layer 83 is formed. The material layer forming step and the solidifying step are repeatedly implemented.

In the inert gas supplying step, at least in each of the solidifying steps, the inert gas which flows in a constant direction directly above the irradiation region S is supplied. In the embodiment, the inert gas supplying step is constantly performed during the lamination molding. In addition, in the solidifying step, the laser beams L1 and L2 are raster-scanned from the downstream side to the upstream side in the flow direction of the inert gas in each of the divided regions. In addition, as described before, the first dividing lines which divide the irradiation region S are set along the flow direction of the inert gas. According to the configuration, the solidified layer 83 can be formed toward the upstream side from the downstream side in the flow direction of the inert gas, that is, a downstream side in a flow direction of the fumes, and thus the influence of the fumes can be suppressed and the molding can be performed.

Figure 21:
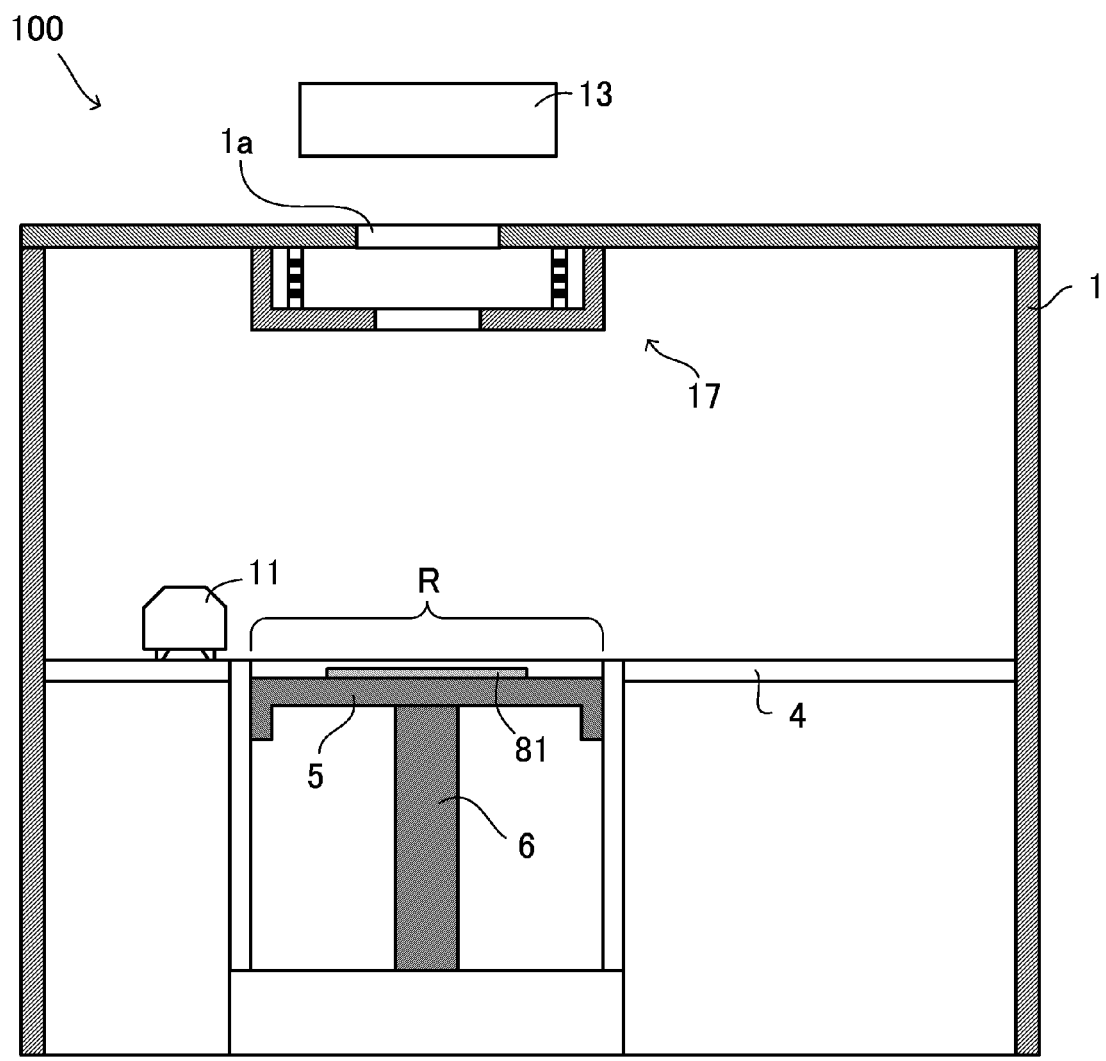
FIG. 21 is a view showing a manufacturing method of a three-dimensional molded object which uses the lamination molding apparatus.

Firstly, the first material layer forming step is performed. As shown in FIG. 21, the height of the molding table 5 is adjusted to an appropriate position in a state in which the base plate 81 is mounted on the molding table 5. In this state, the recoater head 11 is moved from a left side to a right side of the molding region R, and thereby the first material layer 82 is formed on the base plate 81.

Figure 22:
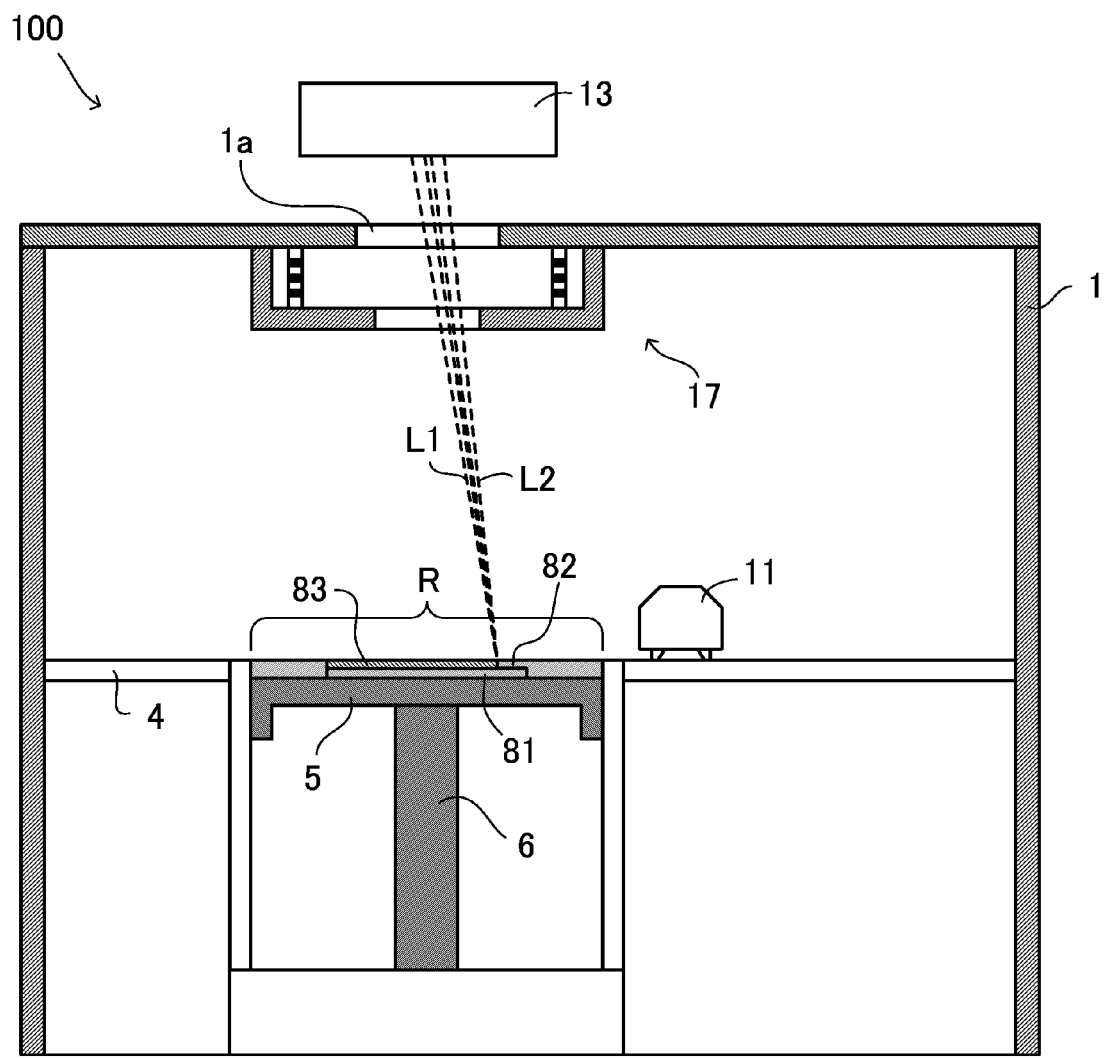
FIG. 22 is a view showing the manufacturing method of the three-dimensional molded object which uses the lamination molding apparatus.

Next, the first solidifying step is performed. As shown in FIG. 22, the laser beams L1 and L2 are irradiated to the predetermined irradiation region S of the first material layer 82, and thereby the first material layer 82 is solidified, and the first solidified layer 83 is formed. In the embodiment, the laser beam L1 scanned by the first galvano scanner 32 and the laser beam L2 scanned by the second galvano scanner 42 are simultaneously irradiated to the divided regions for which the laser beam L1 and the laser beam L2 are respectively responsible. Because each divided region and the irradiation order are appropriately set, the laser beam L1 and the laser beam L2 do not interfere with each other. Moreover, when the irradiation of a predetermined divided region is completed before the completion of the irradiation of another divided region which is irradiated simultaneously with the predetermined divided region, the scanner which is responsible for predetermined divided region waits until the irradiation of another divided region which is irradiated simultaneously with this divided region is completed.

Figure 23:
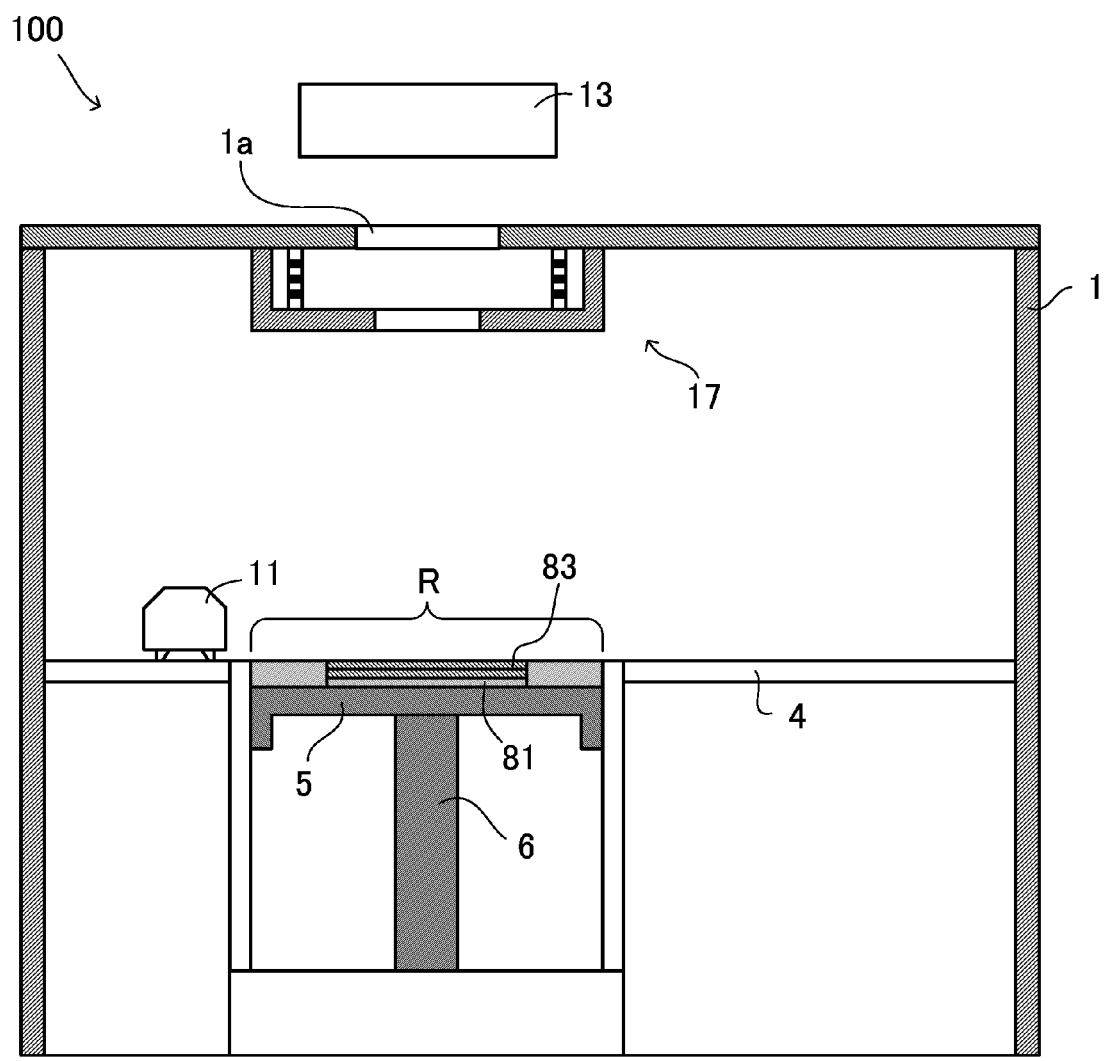
FIG. 23 is a view showing the manufacturing method of the three-dimensional molded object which uses the lamination molding apparatus.

Next, the second material layer forming step is performed. After the first solidified layer 83 is formed, the height of the molding table 5 is lowered by a thickness of the material layer 82. In this state, the recoater head 11 is moved from the right side to the left side of the molding region R, and thereby the second material layer 82 is formed in a manner as covering the first solidified layer 83. Then, the second solidifying step is performed. By the same method as described above, the laser beams L1 and L2 are irradiated to the predetermined irradiation region S of the second material layer 82, and thereby the second material layer 82 is solidified, and as shown in FIG. 23, the second solidified layer 83 is formed.

Until a desirable three-dimensional molded object is obtained, the material layer forming step and the solidifying step are repeated, and a plurality of solidified layers 83 are laminated. The adjacent solidified layers 83 are firmly bonded with each other.

The suitable embodiment of the disclosure is described above, but the disclosure is not limited to the above-described embodiment, and various designs and modifications are possible as long as the designs and modifications are within the scope of claims. For example, the disclosure can also be implemented by the following aspect.

Figure 24:
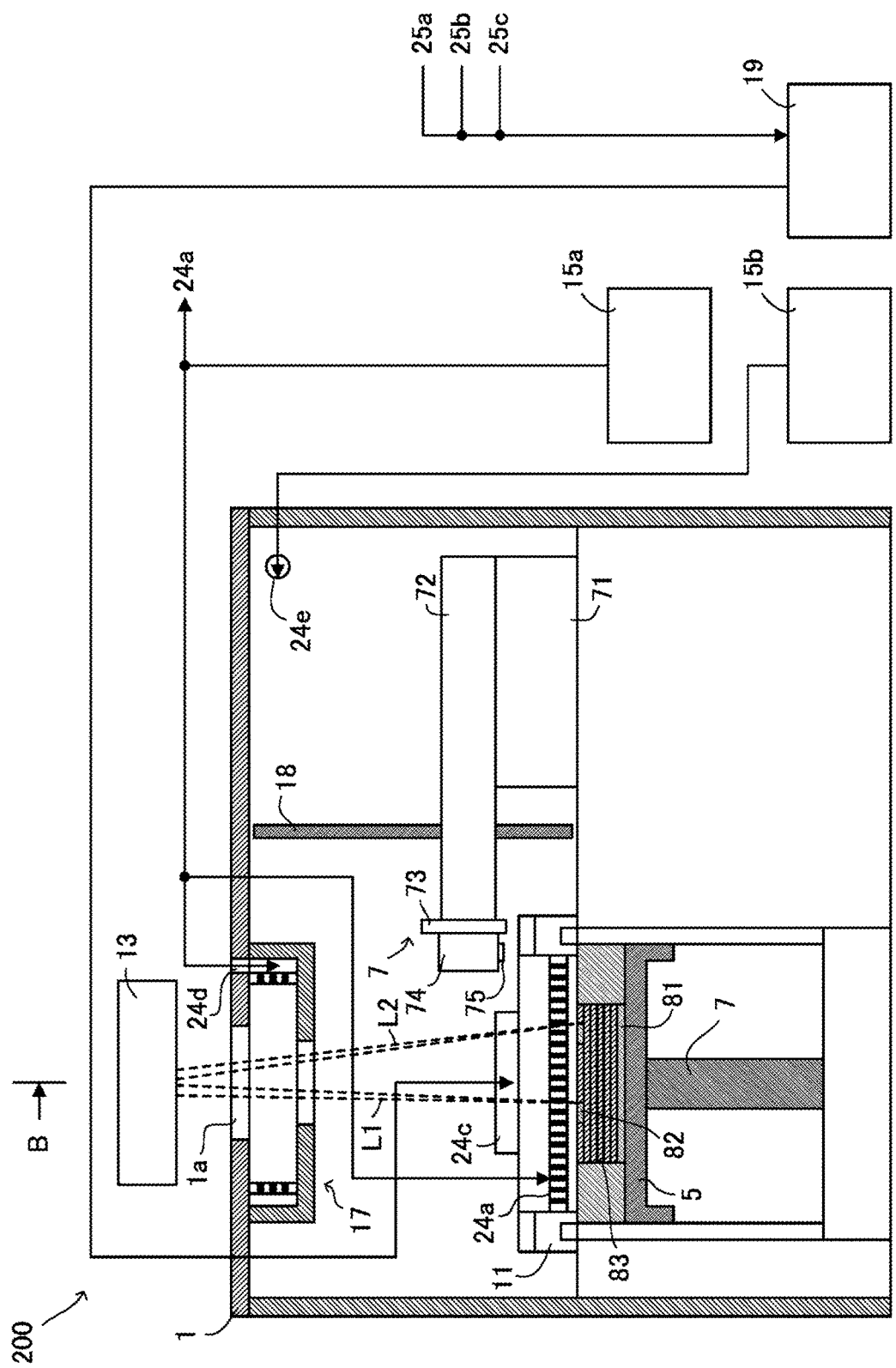
FIG. 24 is a schematic configuration view of a lamination molding apparatus according to a second embodiment.
Figure 25:
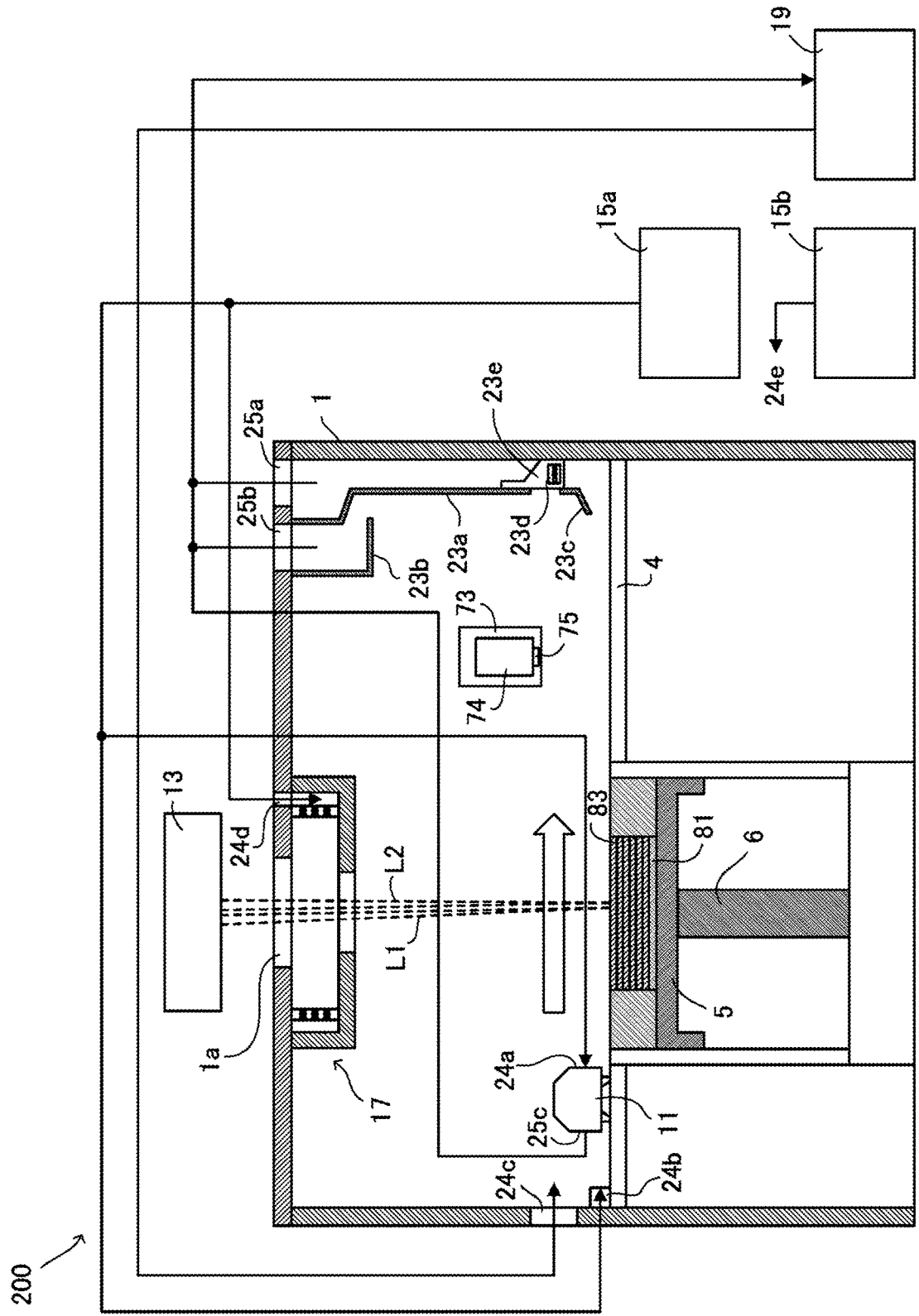
FIG. 25 is an aligned cross-sectional view taken along a line B-B of FIG. 24.

FIG. 24 and FIG. 25 show a lamination molding apparatus 200 of a second embodiment. Moreover, detailed descriptions of members which are equivalent to those of the first embodiment are omitted. The lamination molding apparatus 200 according to the second embodiment includes a cutting device 7 which performs cutting on the solidified layer 83. By bellows 18, the chamber 1 is partitioned into a molding room in which the formation of the three-dimensional molded object is performed, and a drive room which accommodates an X-axis driving device 71 and most part of a Y-axis driving device 72 of the cutting device 7. Between the molding room and the drive room, there is a communication portion which is a gap narrow enough to allow the passage of inert gas.

The cutting device 7 includes: a machining head 74 which is disposed inside the molding room and has a spindle 75; the X-axis driving device 71 which moves the machining head 74 in the X-axis direction; the Y-axis driving device 72 which moves the machining head 74 in the Y-axis direction; and a Z-axis driving device 73 which moves the machining head 74 in a Z-axis direction that is a vertical direction. The spindle 75 is configured so as to be capable of installing and rotating a cutting tool such as an endmill. By the cutting device 7, during the molding of the three-dimensional molded object, the cutting may be implemented on a surface or an unnecessary portion of the solidified layer 83.

An inert gas supply and discharge mechanism of the embodiment includes: a first inert gas supplier 15a; a second inert gas supplier 15b; the fume collector 19; supply ports 24a, 24b, 24c, 24d, and 24e; discharge ports 25a, 25b, and 25c; a partition plate 23a; an upper guide plate 23b; a lower guide plate 23c; fans 23d; current plates 23e; and piping which connects each portion.

The first inert gas supplier 15a is desirably capable of supplying an inert gas which has a concentration higher than that of the inert gas supplied by the second inert gas supplier 15b. For example, the first inert gas supplier 15a is a PSA nitrogen generator, and the second inert gas supplier 15b is a membrane separation type nitrogen generator.

The supply port 24a is arranged on one side surface of the recoater head 11. The supply port 24b is arranged in piping that is laid on the end surface of the base 4 on a side opposed to the side where the supply port 24a is arranged. The supply port 24a and the supply port 24b are respectively connected to the first inert gas supplier 15a. The inert gas having a predetermined pressure and a flow rate alternatively passes through the supply port 24a or the supply port 24b according to the movement position of the recoater head 11, and is supplied to the chamber 1. That is, when the recoater head 11 is in a position where the supply port 24a faces the irradiation region S, the inert gas is supplied through the supply port 24a; and when the recoater head 11 is in a position where the supply port 24a does not face the irradiation region S, the inert gas is supplied through the supply port 24b. The supply port 24c is arranged on a side wall of the chamber 1 on the side where the supply port 24b is arranged. The supply port 24c is connected to the fume collector 19, and the inert gas from which most of the fumes are removed by the fume collector 19 is sent back to the chamber 1 via the supply port 24c. The supply port 24d is arranged on the upper surface of the chamber 1 and is connected to the first inert gas supplier 15a. Via the supply port 24d, the inert gas is supplied toward the inert gas supply space 17d of the fume diffusing device 17. The supply port 24e is arranged in an upper portion of the drive room and is connected to the second inert gas supplier 15b. The inert gas which is supplied from the second inert gas supplier 15b to the drive room passes through the communication portion between the molding room and the drive room, and is supplied to the inside of the molding room.

The partition plate 23a is arranged in a manner as covering a side wall of the chamber 1 on a side opposed to the side where the supply port 24b and the supply port 24c are arranged. The discharge port 25a is arranged on the upper surface of the chamber 1 in a space which is sectioned off by the partition plate 23a and the side wall, and the discharge port 25b is arranged on the upper surface on the irradiation region S side of the chamber 1 in the vicinity of the partition plate 23a. In addition, below the discharge port 25b, the upper guide plate 23b is arranged which extends in an L-shaped cross-section toward the partition plate 23a side in a manner as surrounding the discharge port 25b. At a lower end of the partition plate 23a, the lower guide plate 23c having a lower portion which extends to the irradiation region S side is arranged, and a predetermined gap is formed between the partition plate 23a and the lower guide plate 23c. The gap is positioned at a height lower than the middle of the molding room. The plurality of fans 23d which suck the inert gas to the space sectioned off by the partition plate 23a and the side wall are arranged in the vicinity of the gap, and the current plates 23e extending upward are arranged at both ends of each fan 23d. The inert gas which is sent to the vicinity of the partition plate 23a passes through the space sectioned off by the partition plate 23a and the side wall from below the gap or the lower guide plate 23c and is sent toward the discharge port 25a. In addition, the inert gas which is not completely recovered from the gap rises along the partition plate 23a, is guided by the upper guide plate 23b, and is sent toward the discharge port 25b. The discharge port 25c is arranged on a side surface of the recoater head 11 on the side where the supply port 24a is not arranged. Through the discharge port 25a, the discharge port 25b, and the discharge port 25c, the inert gas is discharged from the chamber 1 and is sent toward the fume collector 19.

According to the configuration, as shown by a hollow arrow in FIG. 25, directly above the irradiation region S, the flow of the inert gas from a left side toward a right side in figure is formed. The fumes are discharged from the chamber 1 with the flow of the inert gas.

Figure 26:
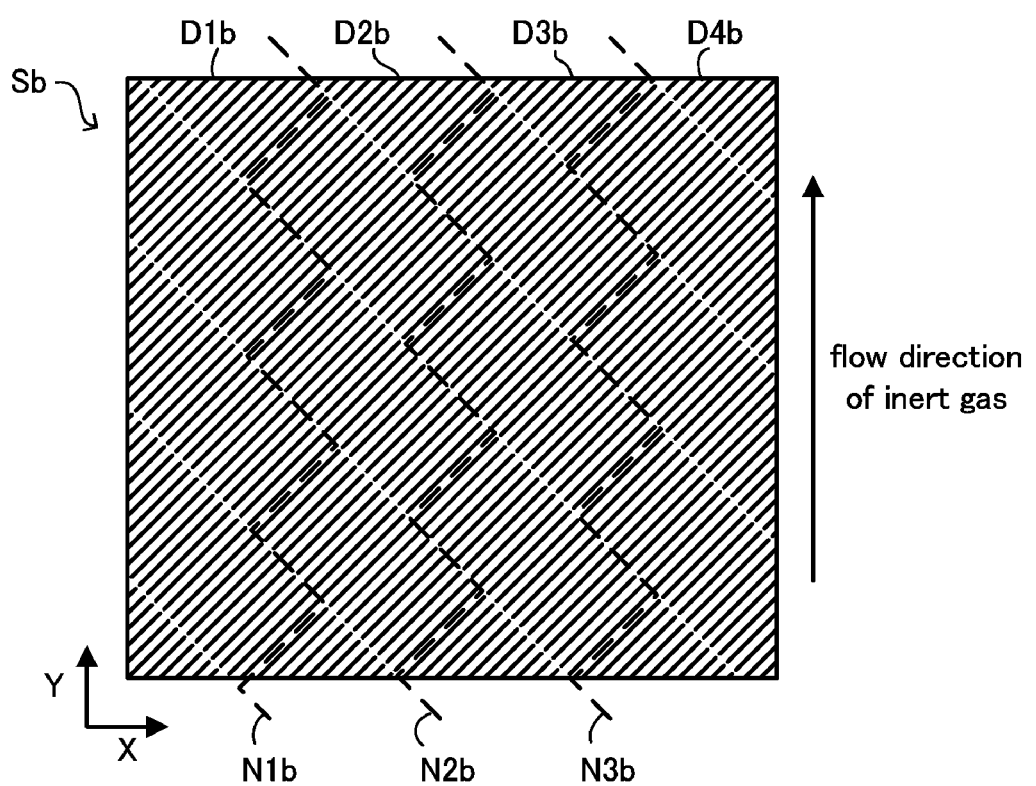
FIG. 26 is a view showing another aspect of first dividing lines.

In addition, in the first embodiment, the first dividing lines are straight lines, but the first dividing lines may not be straight lines as long as the first dividing lines can perform the division in a manner that the irradiation time of each of the divided regions to which the laser beams are simultaneously irradiated substantively becomes substantively equal. For example, in FIG. 26, a predetermined irradiation region Sb is shown which is divided to four divided regions D1b, D2b, D3b, and D4b by first dividing lines N1b, N2b, and N3b. Oblique lines in the irradiation region Sb show scan lines according to the raster scanning. The first dividing lines N1b, N2b, and N3b are set as zigzag lines so as not to cut the scan lines as much as possible.

Various embodiments according to the disclosure are described above, but these embodiments are presented as examples and are not intended to limit the scope of the invention. This new embodiment can be implemented in various other forms, and various omissions, replacements, and modifications can be performed without departing from the gist of the invention. This embodiment and variations thereof are included in the scope and gist of the invention, as well as in the scope of the invention and its equivalents described in the claims.

What is claimed is:

1. A lamination molding method adapted for a lamination molding system comprising a computer aided manufacturing device configured to create a project file and a lamination molding apparatus configured to be controlled based on the project file and repeat: a material layer forming step in which a material layer is formed on a predetermined molding region; and a solidifying step in which laser beams scanned by n scanners are irradiated to a predetermined irradiation region of the material layer, wherein n is an integer equal to or greater than 2, and a solidified layer is formed, the lamination molding method comprising:

a first dividing step, in which the computer aided manufacturing device divides the irradiation region to 2n-1 or more divided regions by a plurality of first dividing lines in a manner that irradiation time of each of the divided regions to which the laser beams are simultaneously irradiated becomes equal;

an irradiation order deciding step, in which the computer aided manufacturing device decides an irradiation order of the divided regions in the solidifying step in a manner that the laser beams are simultaneously irradiated to the divided regions that are not adjacent, and the laser beams are not simultaneously irradiated to the divided regions that are adjacent;

a heat interference determining step, in which after the first dividing step, the computer aided manufacturing device determines whether a magnitude of a shortest distance between the divided regions to which the laser beams are simultaneously irradiated is equal to or greater than a predetermined threshold value; and a first dividing line moving step, in which when the shortest distance is smaller than the threshold value, the computer aided manufacturing device moves at least one of the first dividing lines in a direction perpendicular to the first dividing lines in a manner that the magnitude of the shortest distance becomes equal to or greater than the threshold value.

2. The lamination molding method according to claim 1, further comprising an inert gas supplying step, in which in the solidifying step, an inert gas that flows in a constant direction directly above the irradiation region is supplied at least from a beginning of a formation of a predetermined solidified layer to a completion of the formation of the predetermined solidified layer, wherein in the first dividing step, the computer aided manufacturing device sets the first dividing lines along a flow direction of the inert gas, and in the solidifying step, the laser beams are raster-scanned from a downstream side to an upstream side in the flow direction in each of the divided regions.

3. The lamination molding method according to claim 2, further comprising a fume interference determining step, in which after the first dividing step, the computer aided manufacturing device determines for each of the divided regions whether fume interference occurs in which fumes generated from a determined region that is a divided region to be determined reach a simultaneous irradiation region that is a divided region to which a laser beam is irradiated simultaneously with the determined region; and a second dividing step, in which when the computer aided manufacturing device determines that the fume interference occurs, the computer aided manufacturing device divides the irradiation region by a second dividing line intersecting with the flow direction, wherein after the second dividing step, the computer aided manufacturing device performs the first dividing step and the irradiation order deciding step once again on each of the irradiation regions divided by the second dividing line.

4. The lamination molding method according to claim 3, wherein the second dividing line is orthogonal to the flow direction.

5. The lamination molding method according to claim 3, wherein in the fume interference determining step, when the computer aided manufacturing device determines that the fume interference occurs, the computer aided manufacturing device calculates the following point as one or more fume interference points: a point on the most downstream side in the flow direction in a region of the determined region capable to be a generation source of the fumes which reach the simultaneous irradiation region, or a point on the most upstream side in the flow direction in a region of the simultaneous irradiation region that the fumes generated from the determined region capable to reach, and in the second dividing step, the computer aided manufacturing device sets the second dividing line to pass through a point on the most upstream side in the flow direction among at least one of one or more of the fume interference points.

6. The lamination molding method according to claim 5, wherein in the fume interference determining step, the computer aided manufacturing device determines whether a first straight line and a second straight line pass through the simultaneous irradiation region, wherein the first straight line has a predetermined angle θ with respect to the flow direction and is in contact with the determined region on the upstream side in the flow direction, and the second straight line has a predetermined angle −θ with respect to the flow direction and is in contact with the determined region on the upstream side in the flow direction; and among points at which the first straight line or the second straight line intersects the simultaneous irradiation region, the computer aided manufacturing device calculates a point on the most upstream side in the flow direction as one of the fume interference points.

7. The lamination molding method according to claim 5, wherein in the fume interference determining step, the computer aided manufacturing device determines whether a first straight line and a second straight line pass through the determined region, wherein the first straight line has a predetermined angle θ with respect to the flow direction and is in contact with the simultaneous irradiation region on the downstream side in the flow direction, and the second straight line has a predetermined angle −θ with respect to the flow direction and is in contact with the simultaneous irradiation region on the downstream side in the flow direction; and among points at which the first straight line or the second straight line intersects the determined region, the computer aided manufacturing device calculates a point on the most downstream side in the flow direction as one of the fume interference points.

8. The lamination molding method according to claim 1, wherein in the first dividing step, the computer aided manufacturing device divides the irradiation region in a manner that an area of each of the divided regions to which the laser beams are simultaneously irradiated becomes equal.

9. The lamination molding method according to claim 1, wherein in the first dividing step, the computer aided manufacturing device divides the irradiation region to n×m divided regions, wherein m is an integer equal to or greater than 2.

10. The lamination molding method according to claim 9, wherein in the first dividing step, the computer aided manufacturing device divides the irradiation region to 2n divided regions.

11. The lamination molding method according to claim 1, wherein a number of the scanners is 2, and
in the first dividing step, the computer aided manufacturing device divides the irradiation region to four divided regions.

12. The lamination molding method according to claim 1, wherein an irradiable range of each of the laser beams in all the scanners comprises the entirety of the molding region.

13. A lamination molding method adapted for a lamination molding system comprising a computer aided manufacturing device configured to create a project file and a lamination molding apparatus configured to be controlled based on the project file and repeat: a material layer forming step in which a material layer is formed on a predetermined molding region; and a solidifying step in which laser beams scanned by n scanners are irradiated to a predetermined irradiation region of the material layer, wherein n is an integer equal to or greater than 2, and a solidified layer is formed, the lamination molding method comprising:
a first dividing step, in which the computer aided manufacturing device divides the irradiation region to 2n-1 or more divided regions by a plurality of first dividing lines in a manner that irradiation time of each of the divided regions to which the laser beams are simultaneously irradiated becomes equal;
an irradiation order deciding step, in which the computer aided manufacturing device decides an irradiation order of the divided regions in the solidifying step in a manner that the laser beams are simultaneously irradiated to the divided regions that are not adjacent, and the laser beams are not simultaneously irradiated to the divided regions that are adjacent;
an inert gas supplying step, in which in the solidifying step, an inert gas that flows in a constant direction directly above the irradiation region is supplied at least from a beginning of a foil cation of a predetermined solidified layer to a completion of the formation of the predetermined solidified layer, wherein
in the first dividing step, the first dividing lines are set along a flow direction of the inert gas, and
in the solidifying step, the laser beams are raster-scanned from a downstream side to an upstream side in the flow direction in each of the divided regions;
a fume interference determining step, in which after the first dividing step, the computer aided manufacturing device determines for each of the divided regions whether fume interference occurs in which fumes generated from a determined region that is a divided region to be determined reach a simultaneous irradiation region that is a divided region to which a laser beam is irradiated simultaneously with the determined region; and
a second dividing step, in which when the computer aided manufacturing device determines that the fume interference occurs, the computer aided manufacturing device divides the irradiation region by a second dividing line intersecting with the flow direction, wherein
after the second dividing step, the computer aided manufacturing device performs the first dividing step and the irradiation order deciding step once again on each of the irradiation regions divided by the second dividing line.

14. The lamination molding method according to claim 13, wherein the second dividing line is orthogonal to the flow direction.

15. The lamination molding method according to claim 13, wherein in the fume interference determining step, when the computer aided manufacturing device determines that the fume interference occurs, the computer aided manufacturing device calculates the following point as one or more fume interference points: a point on the most downstream side in the flow direction in a region of the determined region capable to be a generation source of the fumes which reach the simultaneous irradiation region, or a point on the most upstream side in the flow direction in a region of the simultaneous irradiation region that the fumes generated from the determined region capable to reach, and in the second dividing step, the computer aided manufacturing device sets the second dividing line to pass through a point on the most upstream side in the flow direction among at least one of one or more of the fume interference points.

16. The lamination molding method according to claim 15, wherein in the fume interference determining step, the computer aided manufacturing device determines whether a first straight line and a second straight line pass through the simultaneous irradiation region, wherein the first straight line has a predetermined angle $\theta$ with respect to the flow direction and is in contact with the determined region on the upstream side in the flow direction, and the second straight line has a predetermined angle $-\theta$ with respect to the flow direction and is in contact with the determined region on the upstream side in the flow direction; and among points at which the first straight line or the second straight line intersects the simultaneous irradiation region, the computer aided manufacturing device calculates a point on the most upstream side in the flow direction one of the fume interference points.

17. The lamination molding method according to claim 15, wherein in the fume interference determining step, the computer aided manufacturing device determines whether a first straight line and a second straight line pass through the determined region, wherein the first straight line has a predetermined angle $\theta$ with respect to the flow direction and is in contact with the simultaneous irradiation region on the downstream side in the flow direction, and the second straight line has a predetermined angle $-\theta$ with respect to the flow direction and is in contact with the simultaneous irradiation region on the downstream side in the flow direction; and among points at which the first straight line or the second straight line intersects the determined region, the computer aided manufacturing device calculates a point on the most downstream side in the flow direction as one of the fume interference points.

* * * * *